US009316228B2

(12) United States Patent
Becker et al.

(10) Patent No.: US 9,316,228 B2
(45) Date of Patent: Apr. 19, 2016

(54) HIGH-FLOW-CAPACITY CENTRIFUGAL HYDROGEN GAS COMPRESSION SYSTEMS, METHODS AND COMPONENTS THEREFOR

(75) Inventors: Frederick E. Becker, Reading, MA (US); Jamin J. Bitter, Lehi, UT (US); Francis A. DiBella, Roslindale, MA (US); Alexander Gofer, Hanover, NH (US); Robert J. Pelton, Lebanon, NH (US); Sharon E. Wight, Hartland, VT (US); Karl D. Wygant, Pearland, TX (US); Kerry N. Oliphant, Sandy, UT (US)

(73) Assignee: Concepts NREC, LLC, White River Junction, VT (US)

( * ) Notice: Subject to any disclaimer, the term of this patent is extended or adjusted under 35 U.S.C. 154(b) by 1241 days.

(21) Appl. No.: 13/259,934

(22) PCT Filed: Mar. 24, 2010

(86) PCT No.: PCT/US2010/028449
§ 371 (c)(1),
(2), (4) Date: Sep. 23, 2011

(87) PCT Pub. No.: WO2010/111357
PCT Pub. Date: Sep. 30, 2010

(65) Prior Publication Data
US 2012/0011857 A1    Jan. 19, 2012

Related U.S. Application Data

(60) Provisional application No. 61/162,753, filed on Mar. 24, 2009.

(51) Int. Cl.
*F04D 25/04*    (2006.01)
*F04D 17/12*    (2006.01)
(Continued)

(52) U.S. Cl.
CPC . *F04D 25/04* (2013.01); *F02C 3/04* (2013.01); *F02C 6/08* (2013.01); *F04D 17/122* (2013.01); *F04D 25/163* (2013.01)

(58) Field of Classification Search
CPC ....... F04D 29/20; F04D 29/266; F04D 29/30; F04D 29/284; F04D 29/286; F04D 17/122; F04D 25/04; F04D 25/163; F02C 3/04; F02C 3/09; F02C 6/08
See application file for complete search history.

(56) References Cited

U.S. PATENT DOCUMENTS 2,398,203 A * 4/1946 Browne ................ F04D 29/285
415/143
3,904,308 A * 9/1975 Ribaud ................... F04D 21/00
415/143

(Continued)

FOREIGN PATENT DOCUMENTS

| EP | 0129311 A1 | 12/1984 |
| EP | 1600614 A2 | 11/2005 |
| WO | 9723731 A1 | 7/1997 |

OTHER PUBLICATIONS

International Search Report dated Nov. 3, 2010 in connection with parent PCT/US10/28449 filed Mar. 24, 2010; Becker et al.

(Continued)

*Primary Examiner* — William H Rodriguez
*Assistant Examiner* — Karthik Subramanian
(74) *Attorney, Agent, or Firm* — Downs Rachlin Martin PLLC

(57) ABSTRACT

Hydrogen gas compression systems that each include a multistage centrifugal compressor in which each stage has an inlet-to-outlet pressure rise ratio of about 1.20 or greater. In one embodiment, the multistage compressor includes six high-speed centrifugal compressors driven at a speed of about 60,000 rpm. The compressor has an output of more than 200,000 kg/day at a pressure of more than 1,000 psig. The compressors for the compression stages are distributed on both sides of a common gearbox, which has gearing that allows axial thrusts from the compressors to be handled effectively. Each stage's compressor has a unique impeller, which is secured to a support shaft using a tension-rod-based attachment system. In another embodiment, the multistage compressor is driven by a combustion turbine and one or more intercoolers are provided between compression stages. Each intercooler is cooled by coolant from an absorption chiller utilizing exhaust gas from the combustion turbine.

27 Claims, 15 Drawing Sheets

(51) Int. Cl.
  *F04D 25/16* (2006.01)
  *F02C 3/04* (2006.01)
  *F02C 6/08* (2006.01)

(56) References Cited

U.S. PATENT DOCUMENTS

| | | | | |
|---|---|---|---|---|
| 3,976,395 | A * | 8/1976 | Kalnin et al. | 415/199.2 |
| 4,502,837 | A * | 3/1985 | Blair | F01D 5/045 415/198.1 |
| 4,653,976 | A * | 3/1987 | Blair | F01D 5/045 415/1 |
| 4,904,158 | A * | 2/1990 | Kun | F01D 5/048 415/1 |
| 5,213,473 | A * | 5/1993 | Fiala | F01D 5/048 416/183 |
| 5,722,812 | A * | 3/1998 | Knox et al. | 415/199.1 |
| 5,932,940 | A * | 8/1999 | Epstein et al. | 310/40 MM |
| 6,174,131 | B1 * | 1/2001 | Janson | 415/179 |
| 6,392,313 | B1 * | 5/2002 | Epstein et al. | 290/52 |
| 6,425,733 | B1 * | 7/2002 | Ross | 415/55.1 |
| 7,273,352 | B2 * | 9/2007 | Williams | F04D 29/2294 416/175 |
| 7,523,603 | B2 * | 4/2009 | Hagen et al. | 60/39.55 |
| 8,632,320 | B2 * | 1/2014 | Palomba et al. | 417/247 |
| 2002/0073712 | A1 * | 6/2002 | Kopko | 60/775 |
| 2003/0182944 | A1 * | 10/2003 | Hoffman et al. | 60/772 |
| 2004/0219079 | A1 * | 11/2004 | Hagen et al. | 422/194 |
| 2005/0188708 | A1 * | 9/2005 | Wills et al. | 62/175 |
| 2005/0210914 | A1 * | 9/2005 | Allam et al. | 62/607 |
| 2005/0232775 | A1 * | 10/2005 | Thiele et al. | 416/204 R |
| 2005/0252832 | A1 * | 11/2005 | Doyle et al. | 208/390 |
| 2005/0252833 | A1 * | 11/2005 | Doyle et al. | 208/390 |
| 2006/0165522 | A1 * | 7/2006 | Werner | 415/206 |
| 2007/0122272 | A1 * | 5/2007 | Guillard et al. | 415/198.1 |
| 2008/0304954 | A1 * | 12/2008 | Hoffman et al. | 415/17 |
| 2009/0180939 | A1 * | 7/2009 | Hagen et al. | 422/194 |
| 2009/0314698 | A1 * | 12/2009 | Higbee | 210/150 |
| 2010/0111680 | A1 * | 5/2010 | Binder et al. | 415/177 |
| 2011/0262271 | A1 * | 10/2011 | Fukuda et al. | 415/220 |

OTHER PUBLICATIONS

Written opinion dated Nov. 3, 2010 in connection with parent PCT/US10/28449 filed Mar. 24, 2010; Becker et al.

* cited by examiner

HIGH-FLOW-CAPACITY CENTRIFUGAL HYDROGEN GAS COMPRESSION SYSTEMS, METHODS AND COMPONENTS THEREFOR

RELATED APPLICATION DATA

This application claims the benefit of priority of U.S. Provisional Patent Application Ser. No. 61/162,753, filed Mar. 24, 2009, and titled "Centrifugal Hydrogen Gas Compression System And Method," which is incorporated by reference herein in its entirety.

FIELD OF THE INVENTION

The present invention generally relates to the field of gas compression. In particular, the present invention is directed to high-flow-capacity centrifugal hydrogen gas compression systems, methods and components therefor.

BACKGROUND

The growth and establishment of a hydrogen economy requires an efficient and cost effective hydrogen compressor for high volumetric transport of hydrogen through pipelines. The U.S. Department of Energy's National Hydrogen Energy Roadmap reported, "the primary challenge to using more hydrogen in our energy systems is the cost of producing, storing, and transporting hydrogen." A practical hydrogen economy requires a huge infrastructure buildup, including production, storage and delivery, to replace the currently existing gasoline and natural gas infrastructure.

Significant research is ongoing in the area of very high-pressure hydrogen compression for refueling station applications in which pressures up to 12,000 psi are desired. These systems include multi-stage reciprocating piston and diaphragm compressors, liquid-piston compressors, electro-chemical compression (high-pressure electrolyzers), and metal and chemical hydride gas compression. However, for hydrogen pipeline applications, the flow rates and power requirements are many orders of magnitude greater, and as such, reciprocating gas compressor technology is currently the dominant approach. Current hydrogen pipeline compressors capable of high volumes are capital intensive with poor reliability and high maintenance cost. To meet the future needs of the hydrogen infrastructure, advanced high efficiency compressors that overcome these issues are required.

SUMMARY OF THE DISCLOSURE

In one implementation, the present disclosure is directed to an apparatus. The apparatus includes: an impeller support shaft having a first end, a second end spaced from the first end, a first rotational axis, and a first central bore extending from the first end to the second end along the first rotational axis, wherein the impeller support includes at least one bearing region for engaging at least one of a rotational bearing and a thrust bearing during use of the apparatus; a centrifugal impeller that includes a rotor body and a plurality of blades arranged generally radially on the rotor body, wherein the centrifugal impeller has a second rotational axis and the rotor body has a length along the second rotational axis and a second central bore extending along the second rotational axis to a depth that is less than the length; and an impeller attachment system engaging the second central bore and the second end of the impeller support shaft so as to secure the centrifugal impeller to the impeller support shaft at the first end of the impeller support shaft such that the first and second rotational axes are coincident with one another, the impeller attachment system including a tension rod extending through the first longitudinal central bore compressing the impeller support shaft between the first and second ends thereof.

In another implementation, the present disclosure is directed to a system. The system includes: a hydrogen gas compressor that includes: a gearbox; and a plurality of centrifugal compressors connected to the gearbox so as to be driven via the gearbox, the plurality of centrifugal compressors fluidly interconnected with one another so as to provide a plurality of sequential compression stages, wherein each of the plurality of centrifugal compressors is operatively configured to provide a pressure increase ratio of at least 1.20 to hydrogen gas being compressed thereby during normal operation.

In still another implementation, the present disclosure is directed to a system. The system includes: a hydrogen gas compressor that includes: a gearbox comprising a housing having a first side and a second side spaced from the first side; and a first plurality of centrifugal compressors: located on the first side of the gearbox; and connected to the gearbox so as to be driven via the gearbox; and a second plurality of centrifugal compressors: located on the second side of the gearbox; connected to the gearbox so as to be driven via the gearbox; and fluidly interconnected with one another so as to provide a plurality of sequential compression stages; wherein: all of the first and second pluralities of centrifugal compressors are interconnected with one another so as to provide a plurality of sequential compression stages; and the gearbox further includes a first bull gear and a plurality of dual-bull-gear assemblies engaging the first bull gear so as to be driven thereby, wherein each of the plurality of dual-bull-gear assemblies includes a second bull gear for driving a corresponding compressor of the first plurality of centrifugal compressors, and a third bull gear for driving a corresponding compressor of the second plurality of centrifugal compressors.

In yet another implementation, the present disclosure is directed to a system. The system includes: an inlet for receiving a stream of hydrogen gas; a hydrogen gas compressor for compressing a stream of hydrogen gas, the hydrogen gas compressor including a plurality of centrifugal compressors fluidly coupled with one another so as to provide a plurality of compression stages; at least one intercooler for cooling the stream of hydrogen gas between ones of the plurality of compression stages; a combustion turbine operatively coupled to the hydrogen gas compressor so as to drive the hydrogen gas compressor, wherein the combustion turbine produces exhaust during operation; and an absorption chiller system operatively connected to the at least one intercooler so as to provide a coolant thereto, the absorption chiller system including at least one absorption chiller that utilizes the exhaust of the combustion turbine during operation of the system to cool the coolant.

In still yet another implementation, the present disclosure is directed to a method of selecting a surge-control valve of a centrifugal gas compressor for an emergency shutdown condition. The method includes: inputting a value of a surge-control valve flow coefficient into a computerized model of a gas compression system that accounts for mass-inertia of rotating parts within the centrifugal gas compressor and within a prime mover powering the gas compression system after the prime mover is shutdown; executing the model with the value at a plurality of times following the shutdown so as to establish an emergency shutdown path; assessing the emergency shutdown path to one or more criteria for determining the suitability of the value; if the emergency shutdown path corresponding to the value satisfies the one or more criteria, selecting the surge-control valve based on the value; and if the emergency shutdown path corresponding to the value does not satisfy the one or more criteria, repeating the inputting, executing and assessing steps as many times as necessary with a differing value of the surge-control valve flow coefficient each time until the corresponding emergency shutdown path satisfies the one or more criteria and, then, selecting the surge-control valve based on the differing value corresponding to the satisfying emergency shutdown path.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
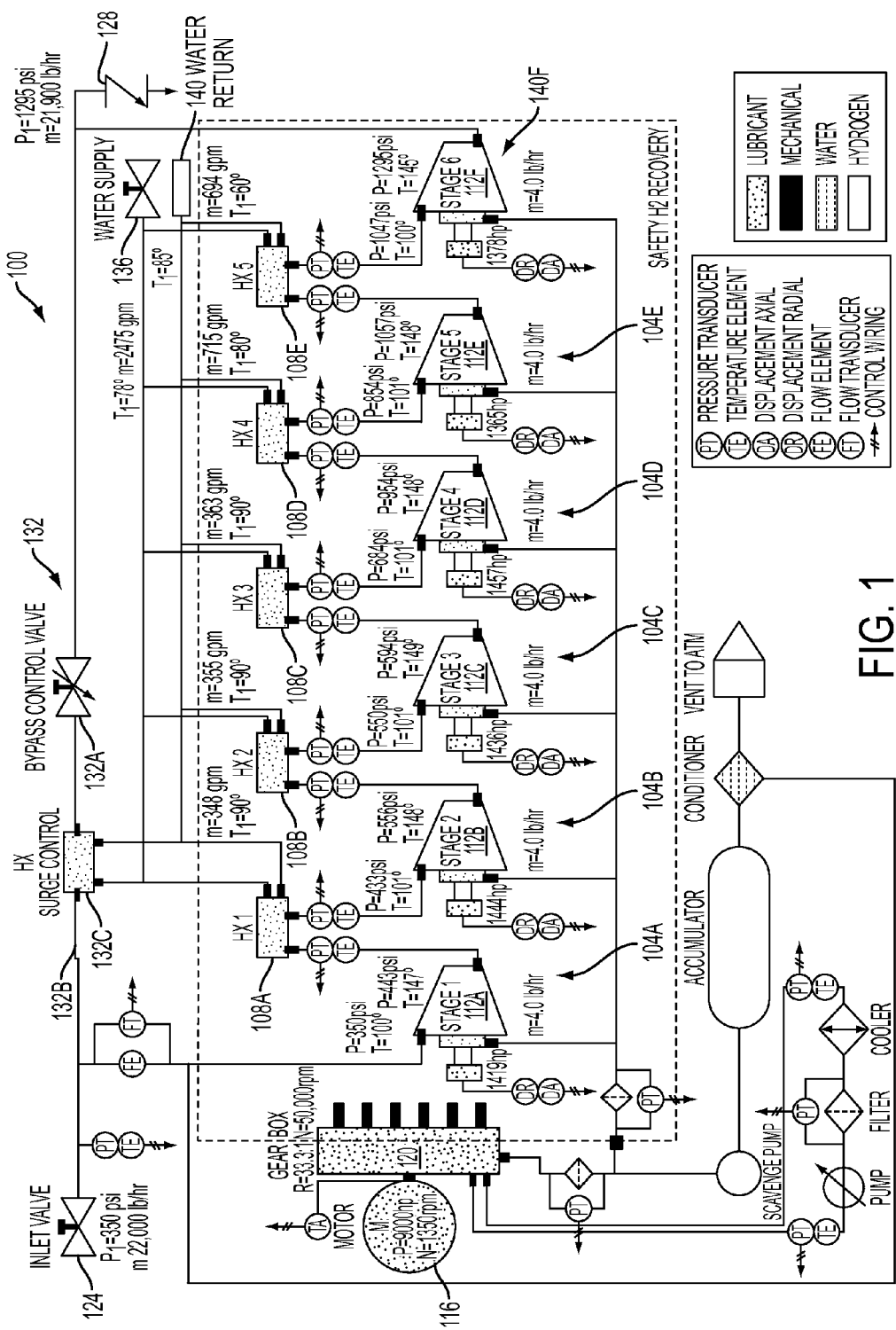
FIG. 1 is a high-level schematic diagram of a high-flow-capacity centrifugal hydrogen gas compression system made in accordance with the present disclosure.

Referring now to the drawings, FIG. 1 illustrates a high-flow-capacity centrifugal hydrogen gas compression system 100 that has a number of unique features that allow it to compress hydrogen gas to a discharge pressure greater than 1,000 psig at a flow rate of greater than 200,000 kg/day with 98% efficiency, while maintaining 99.99% hydrogen purity and all in a relatively small package size. As those skilled in the art will readily appreciate, system 100 is highly suitable for application in a hydrogen distribution system of a hydrogen economy and is an economical, efficient replacement for reciprocating compressors in such a distribution system. The unique features of system 100 include, but are not limited to: 1) a special impeller design that enables very high speeds; 2) an special impeller/shaft assembly design that readily enables the use of differing materials; 3) a unique gearbox design that balances thrust loads and 4) a unique control system design that allows system 100 to operate relatively near its surge instability region so as to maximize performance. Each of these and other unique features of system 100 is described below in detail.

In this example, system 100 is designed to provide a hydrogen discharge pressure of about 1,285 psig at a flow rate of about 240,000 kg/day and with a hydrogen efficiency of 98% (btu/btu) and a hydrogen purity of 99.99%. System 100 achieves this performance using six sequentially arranged compression stages 104A-F with five intercooling heat exchangers 108A-E fluidly coupled between adjacent ones of the stages. In this example, each compression stage 104A-F comprises a corresponding centrifugal compressor 112A-F, which is driven by a prime mover 116 via a common gearbox 120. The combination of compressors 112A-F and gearbox 120 is referred to hereinafter as a "multistage compressor" based on the functionality of the combination. A particular example of a multistage compressor 200 suitable for use as the multistage compressor of FIG. 1 is described below in connection with FIGS. 2-7. Prime mover 116 can be one or more fixed-speed electric motors, variable-speed electric motors, steam turbines, combustion turbines, reciprocating internal combustion engines, or any combination thereof, among others. In one of the examples below, prime mover 116 is a four-pole fixed-speed electric motor having a rotor speed of 1,800 rpm. In another of the examples below, prime mover 116 is a combustion turbine.

System 100 includes an inlet valve 124 and an outlet check valve 128. In this example, inlet valve 124 is fluidly coupled to a hydrogen source (not shown) that provides hydrogen at a mass flow rate of about 22,000 lb/hr at a pressure of about 350 psi and a temperature of about 100° F. Outlet check valve 128 is fluidly coupled to, for example, a pipeline system (not shown) for carrying the hydrogen to one or more destination locations. When system 100 is operating normally, outlet check valve 128 outputs compressed hydrogen at a mass flow rate of about 21,900 lb/hr at a pressure of about 1,295 psi and a temperature of about 145° F. A bypass/surge-control system 132, which includes valve 132A and associated piping 132B, is provided for bypassing compression stages 104A-F and for controlling the operation of system 100 during startup, during transient conditions, such as emergency shutdown, and so that the system operates at peak performance during normal operation. Bypass/surge control system 132 may also include a surge control heat exchanger 132C to reduce the suction temperature of recirculating hydrogen in the event that continuous recirculation is needed to prevent surge. In this example, heat exchanger 132C is plumbed in parallel with heat exchangers 108A-E to a supply 136 and return 140 of a suitable coolant, such as water.

In one example wherein the pressures and mass flow rates are as mentioned above, each of compressors 112A-F is driven to a rotational speed of about 60,000 rpm. When prime mover 116 is an electric motor having a fixed rotor speed of 1,800 rpm, gearbox 120 must, therefore, provide a final drive ratio of about 33:1. If prime mover 116 is a device operating at a higher speed, such as a steam turbine, combustion turbine or a variable speed electric motor driven at a higher frequency, the final drive ratio that gearbox 120 must provide can be much lower.

Figure 2:
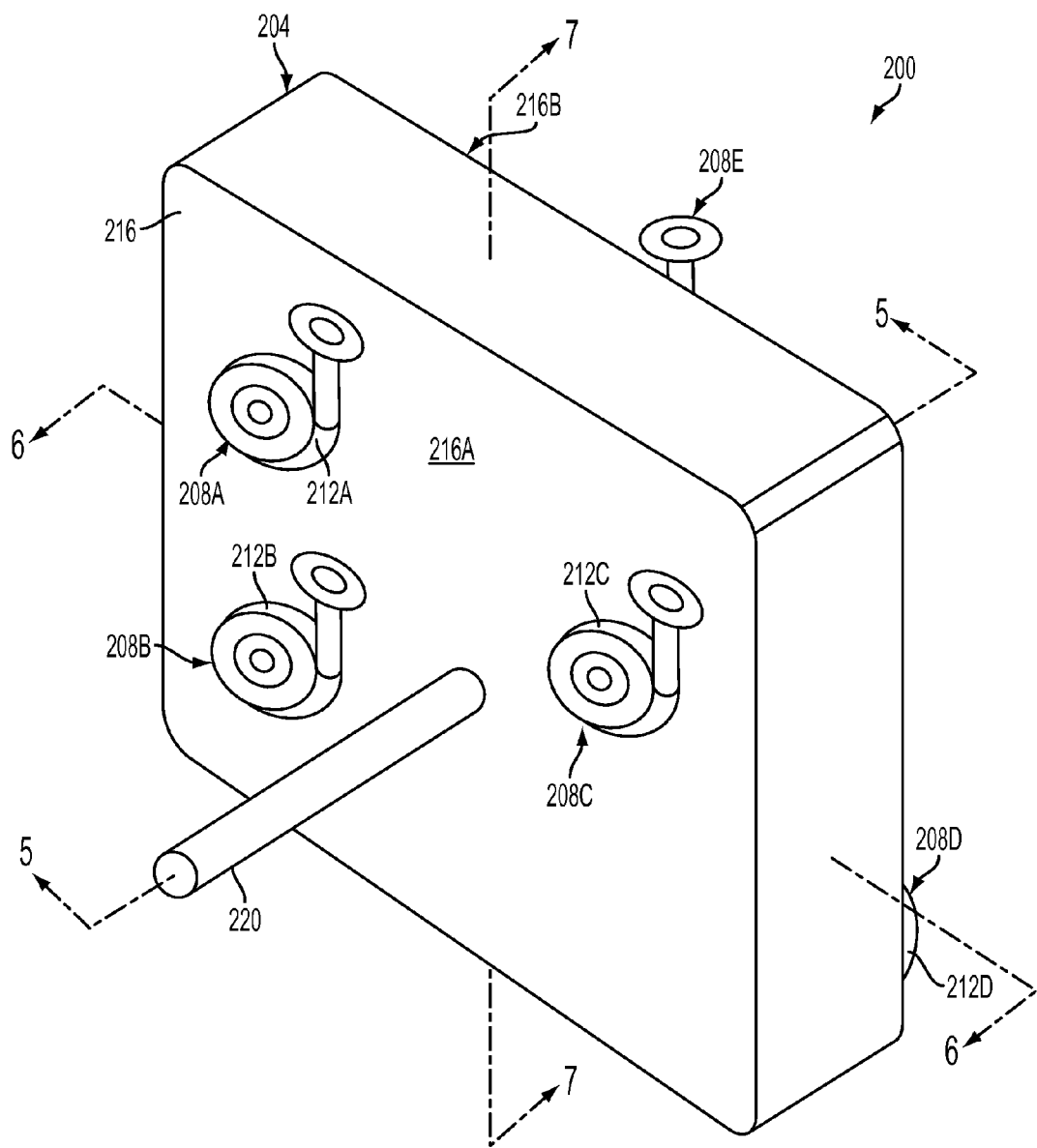
FIG. 2 is an isometric view of a six-stage multistage compressor that can be used with the system of FIG. 1.

As mentioned above, FIG. 2 illustrates a particular six-stage multistage compressor 200 that can be used as the multistage compressor in centrifugal hydrogen gas compression system 100 of FIG. 1. As seen in FIG. 2, multistage compressor 200 includes a gearbox 204 and six compressors 208A-F (only compressors 208A-E are seen in FIG. 2) that provide six sequential stages of compression, such as compression stages 104A-F of FIG. 1. It is noted that the piping necessary for sequentially coupling compressors 208A-F to one another and/or to intercoolers is not shown for the sake of clarity. Each compressor 208A-F includes a corresponding compressor housing 212A-F (only housings 212A-D are seen in FIG. 2) that houses a corresponding impeller (not show, but may be any suitable impeller, such as either one of impellers 304, 348 of FIGS. 3A-B, respectively). As will be described below in greater detail, each of impellers 304, 348 is 8 inches (20.32 cm) in diameter and driven at a peak speed of 60,000 rpm during normal operation when used in the six-stage example of FIG. 1 with the mass-flow and pressure conditions noted above.

Figure 5:
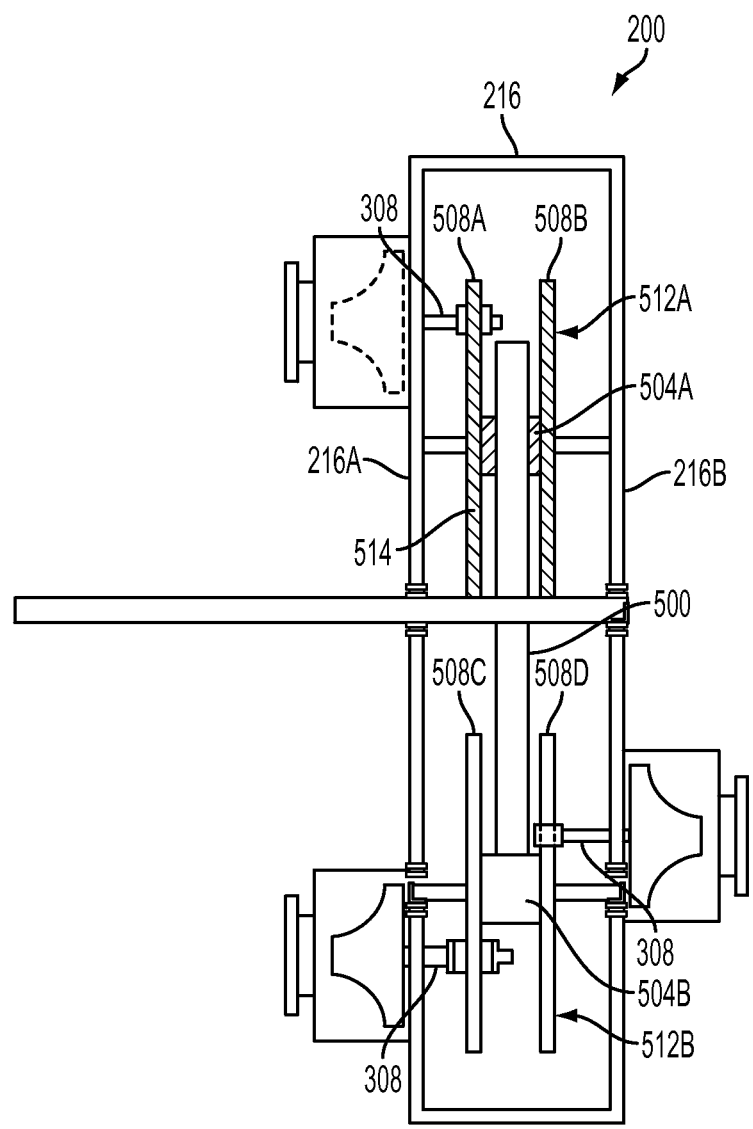
FIG. 5 is a cross-sectional view of the gearbox of FIG. 2 as taken along line 5-5 of that figure.
Figure 6:
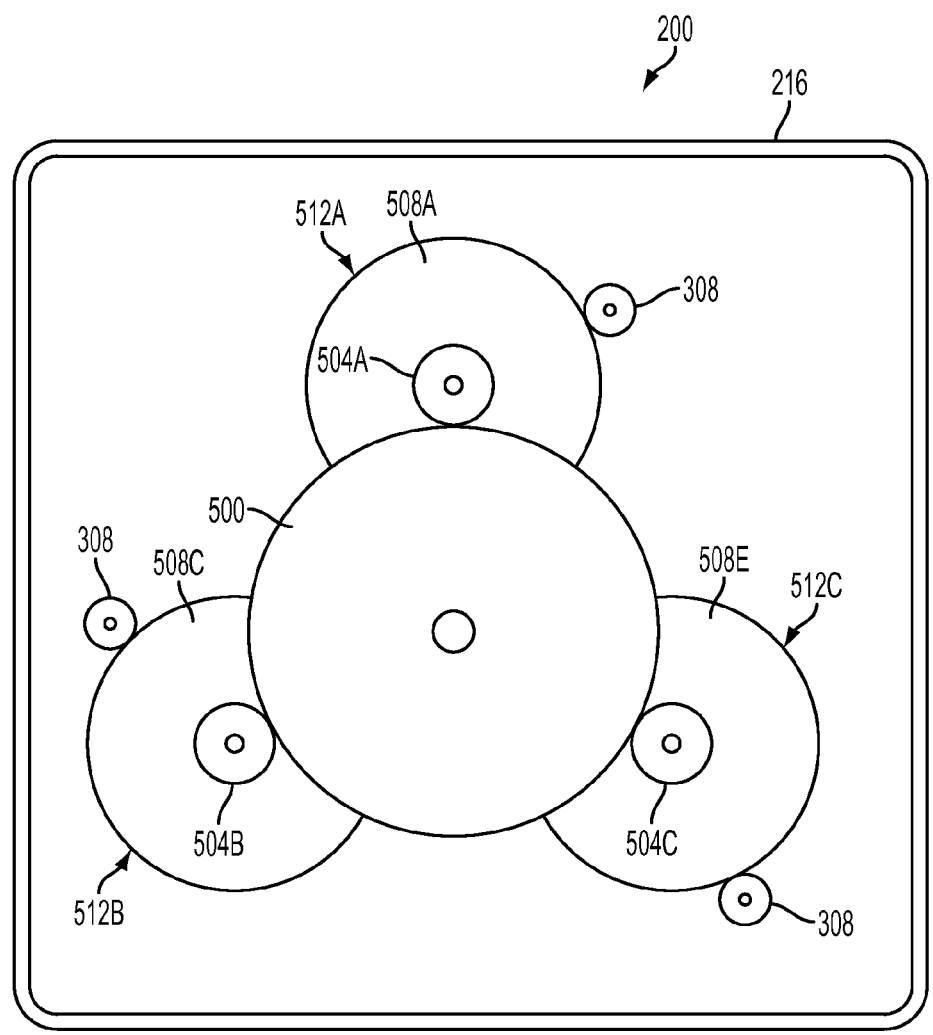
FIG. 6 is a cross-sectional view of the gearbox of FIG. 2 as taken along line 6-6 of that figure.
Figure 7:
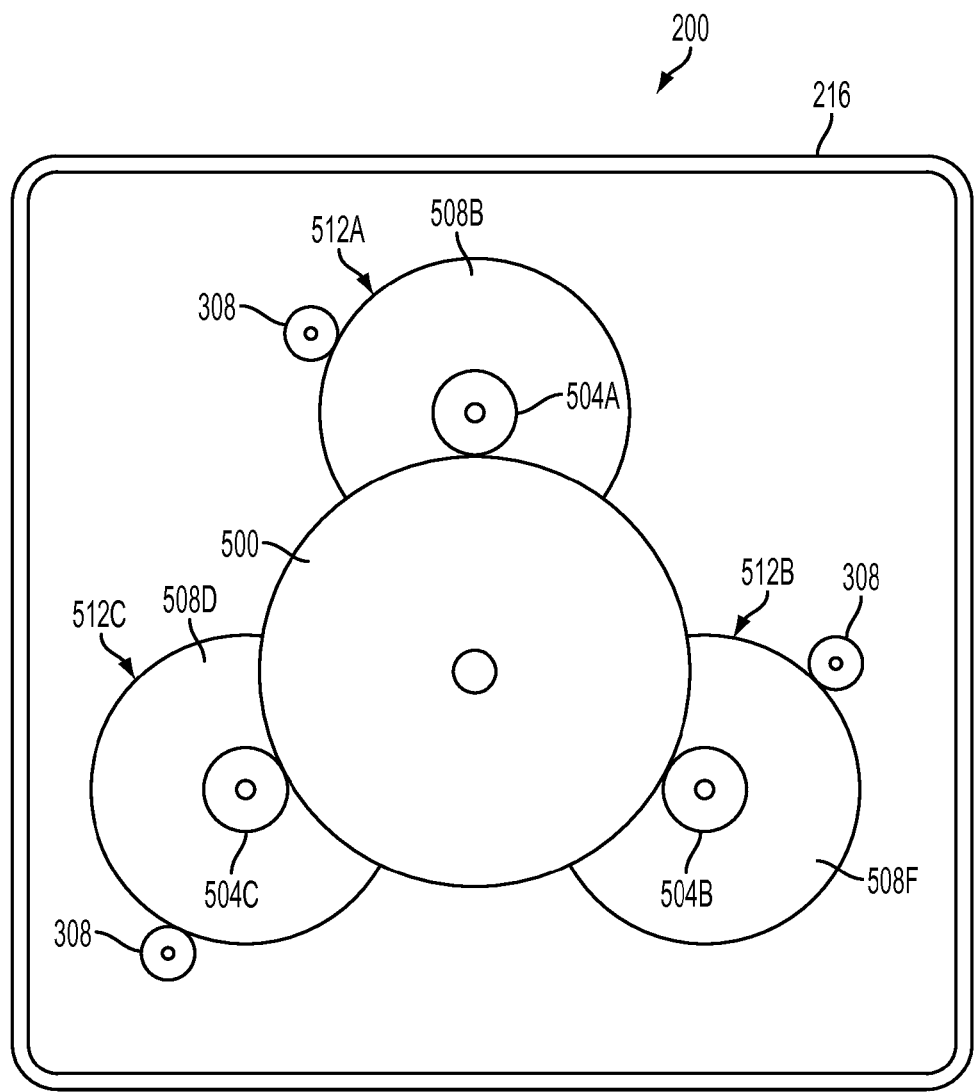
FIG. 7 is a cross-sectional view of the gearbox of FIG. 2 as taken along line 7-7 of that figure.

Gearbox 204 includes a housing 216 having a front face 216A and a rear face 216B spaced from one another to accommodate gearing and other internal components (see FIGS. 5-7). In this context, the terms "front" and "rear" are used simply to designate the locations of the faces relative to the prime mover (not shown) that provides power to gearbox 204 via an input shaft 220. In this example, three compressor housings 212A-C are mounted to gearbox 204 on front face 216A and three compressor housings are mounted to the gearbox on rear face 216B. This design, in combination with gearing (FIGS. 5-7) inside gearbox 204, provides a number of advantages, including compactness of multistage compressor 200 and handling of thrust loads on the gearing from compressors 208A-F.

Figure 3A:
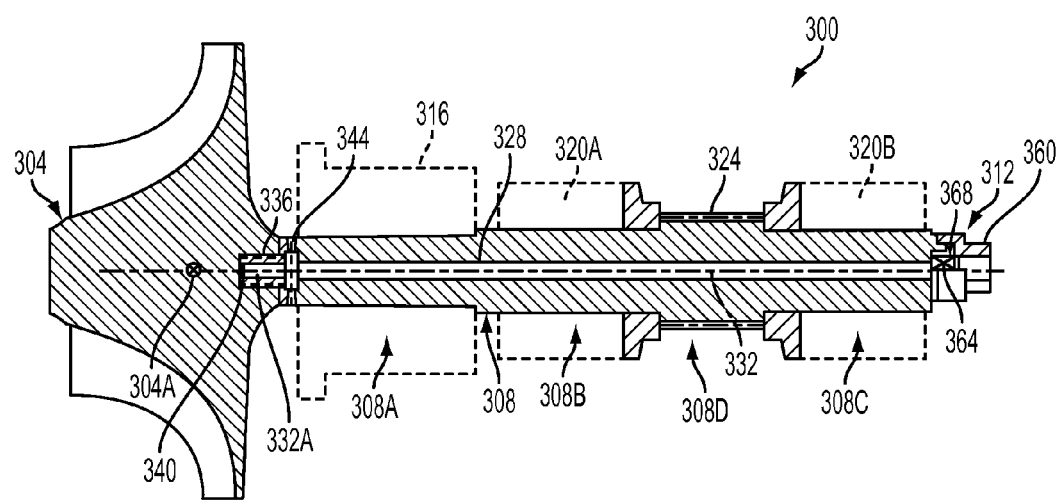
FIG. 3A is a partial cross-sectional/partial side view of an impeller/shaft assembly that can be used in each of the six stages of the multistage compressor of FIG. 2.

FIG. 3A illustrates an impeller/shaft assembly 300 that can be used in each of compressors 208A-F of FIG. 2. Impeller/shaft assembly 300 includes an impeller 304, a shaft 308 and an impeller attachment system 312 that secures the impeller to the shaft. Impeller attachment system 312 provides an important benefit of readily permitting the use of differing materials for impeller 304 and shaft 308 so as to optimize those materials without compromising on compressor performance. In one example, impeller 304 is made of a high-strength aluminum alloy, such as a 7075-T6 or 2618-T7 alloy, or other metal, such as a high-strength titanium alloy coated with a coating that protects the titanium alloy from the hydrogen being compressed. While impeller 304 can be made of any material suitable for the conditions of compressing hydrogen gas, shaft 308 can be made of a durable metal typically used for turbomachinery shafts, such as steel. Impeller attachment system 312 also provides an important benefit of being able to make the rotor body 304A without a full-length central bore, thereby avoiding stress concentrators in high-stress regions of the rotor body. This allows impeller 304 to be operated at the high speeds necessary to achieve the high performance of a multistage hydrogen gas compressor, such as compressor 200 of FIG. 2.

In this example, shaft 308 has a stepped design, which includes a seal region 308A for receiving a suitable seal 316 (which would form a seal with gearbox housing 216 of FIG. 2), two radial/axial bearing regions 308B-C for receiving, respectively, suitable radial/axial bearings 320A-B, and a pinion region 308D containing teeth 324 that engage gearing within gearbox 204 (FIG. 2). In one example, teeth 324 have a helical configuration, as discussed below in more detail. Shaft 308 also includes a central bore 328 extending the full length of the shaft and containing a tension rod 332 of impeller attachment system 312 that secures impeller 304 to the shaft.

In addition to tension rod 332, impeller attachment system 312 includes a threaded insert 336 engaged with impeller 304 in a central bore 340 in the impeller. Insert 336 can be secured to impeller 304 in any suitable manner, such as by threaded engagement or using a heat-shrink fit. Insert 336 threadedly receives a corresponding threaded end 332A of tension rod 332. In one example, threaded insert 336 is made of steel, though another suitable material can be used. In this embodiment, insert 336 and the impeller-engaging end of shaft 308 include inter-engaging face splining 344 to inhibit rotation between the two parts and between impeller 304 and the shaft. It is noted that in other embodiments, such as the embodiment shown in FIG. 3B, an insert such as insert 336 of FIG. 3A need not be used. For example, in FIG. 3B, tension rod 348 directly threadedly engages a threaded central bore 352 in impeller 356.

Figure 3B:
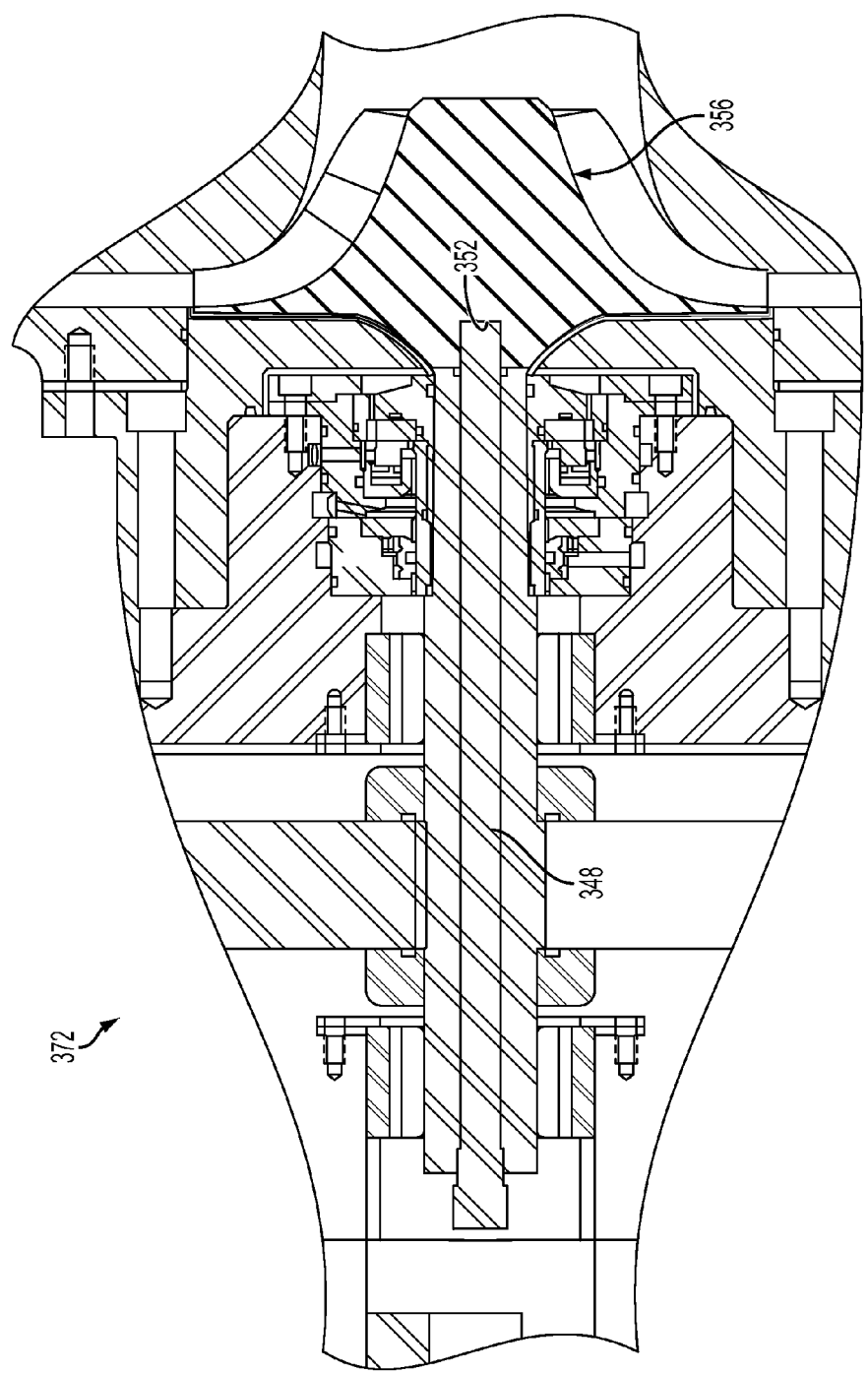
FIG. 3B is a cross-sectional view of an alternative impeller/shaft assembly that can be used in each of the six stages of the multistage compressor of FIG. 2.

Returning to FIG. 3A, impeller attachment system 312 of this example also includes nut 360 that threadedly engages tension rod 336. A retainer 364 and a set 368 of spring washers is provided to assist in ensuring that nut 360 is not overtightened. In other embodiments, such as the embodiment shown in FIG. 3B, such a spring-washer/retainer arrangement is not used, and other means are implemented for ensuring the correct amount of tension is induced into tension rod 348. As those skilled in the art will readily appreciate, when tension rod 332 of FIG. 3A and tension rod 348 of FIG. 3B are properly tensioned to secure the respective impeller 304, 356 to the respective shaft 308, 352, the shafts are placed into compression to counteract the tension in the tension rods. The use of impeller attachment system 312 provides a number of advantages. For example, face splining 344 can be used instead of a simply spin-on type arrangement between impeller 304 and shaft 308, thereby providing a much more positive engagement of the impeller with the shaft. In addition, with impeller attachment system 312 impeller 304 can be readily removed, for example during maintenance outages, without removing shaft 308.

Figure 4:
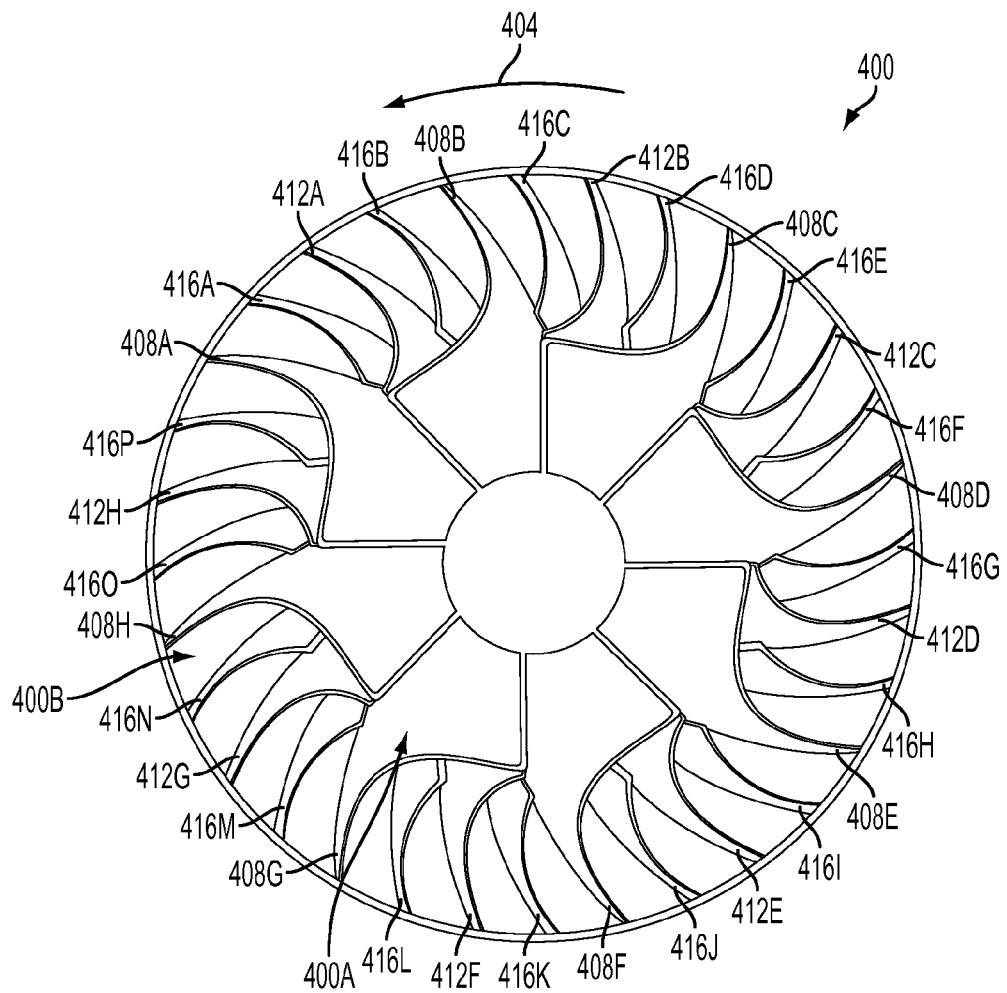
FIG. 4 is a front view of each of the impellers of the corresponding respective impeller shaft/assemblies of FIGS. 3A-B.

FIG. 4 illustrates a blade configuration 400 that can be used on each of impellers 304, 356 of FIGS. 3A-B, respectively. In this example, the rotation of each impeller 304, 356 during use is counterclockwise in the direction of arrow 404. In this example, blade configuration 400 utilizes a dual split-impeller design having eight long blades 408A-H, eight intermediate-length blades 412A-H and sixteen short blades 416A-P arranged so that each intermediate-length blade is located midway between a corresponding pair of long blades and each short blade is located midway between a corresponding long blade and an adjacent intermediate-length blade. Each of blades 408A-H, 412A-H, 416A-P is forward-swept at each of the inlet and exit regions 400A-B of blade configuration 400. In other words, both the leading and trailing ends of blades 408A-H, 412A-H, 416A-P, relative to the flow of hydrogen during operation, is curved in the direction of rotation direction 404. In the example shown, the trailing ends of blades 408A-H, 412A-H, 416A-P have a forward sweep of about 30° in the direction of rotation. This is the angle of the blades at the trailing edge as measured from a radial line extending from the axis of rotation.

The incorporation of forward curved blades 408A-H, 412A-H, 416A-P at exit region 400B provides an increased pressure ratio, and the dual split impeller design provides higher efficiency and pressure ratio. The use of these and other improvements to conventional process compressor impeller designs has resulted in improvements in impeller efficiency while also maintaining a high impeller stage pressure ratio that advances the art for high capacity hydrogen compression. The forward sweep of blades at exit region 400B increases the exit tangential velocity for a higher work coefficient. The reduced blade count at inlet region 400A resulting from the split impeller design reduces inlet blockage for higher pressure ratio and efficiency at a given flow rate, and the second set of splitter blades 416A-P towards exit region 400B reduces the blade loadings, which increase as the inlet blade count decreases. These factors contribute to the high efficiency of blade configuration 400 as well as an increase in the work input and achievable pressure ratio.

In this example, the outside diameter, Do, of blade configuration 400, and hence each impeller 304, 356, is 8 inches. When each impeller 304, 356 is driven at a speed of 60,000 rpm, the stresses within that impeller are safely handled by the material used, for example, any of the alloys mentioned above and the corresponding hydrogen gas compression system, such as system 100 of FIG. 1, can provide very good performance. As an example, the following Table provides performance details for a case in which the inlet pressure and temperature of the hydrogen provided to system 100 (FIG. 1) at inlet valve 124 are 350 psi and 100° C., respectively.

side of the large bull gear, at a speed ratio of 10. Each small bull gear 508A-F drives a corresponding one of compressors 208A-F (FIG. 2) at a speed ratio of 3.33, for a final drive ratio of 33.3:1. As will be appreciated by those skilled in the art, when shaft 308 of FIG. 3A is used for each of compressors 208A-F, each small bull gear 508A-F meshes with such shaft at pinion region 308D. An important benefit to using the dual-bull-gear arrangement of gearbox 204 in which pairs of compressors 208A-F on opposite faces 216A-B are driven by a corresponding dual-bull-gear assembly 512A-C is that thrust loads from the compressors are balanced. As mentioned above, pinion region 308D on shaft 308 of impeller/shaft assembly 300 has helical teeth 324. Each small bull gear 508A-F has matching helically-configured teeth 514. Because of the helical configuration of meshing teeth 324, 514, thrust loads from compressors 208A-F on opposing faces of gearbox 204 driven by a particular common dual-bull-gear assembly 512A-C are transmitted to that assembly. Because such opposing compressors 208A-F are driven in the same direction on opposing sides of gearbox 204, during normal operation the axial thrusts therefrom are in opposing directions so that they generally cancel one another within that dual-bull-gear assembly 512A-C.

Figure 8:
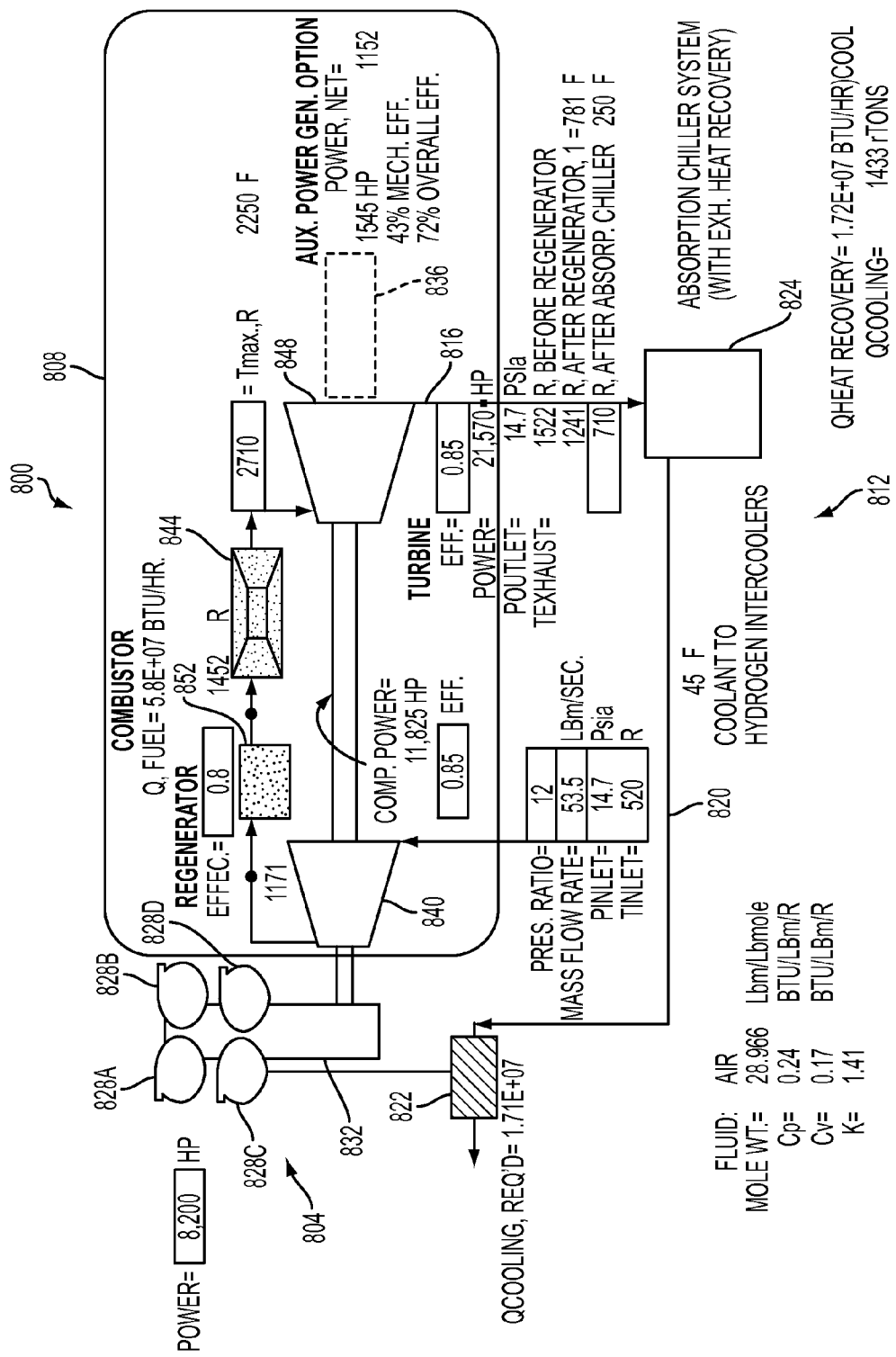
FIG. 8 is a high-level schematic diagram of an alternative centrifugal hydrogen gas compressor system that utilizes a combustion turbine as the prime mover for the multi-stage compressor.

FIG. 8 illustrates a hydrogen gas compression system 800 that can be similar to or the same as system 100 of FIG. 1, except that the prime mover for powering the multistage compressor 804 is a combustion turbine 808. Since hydrogen gas is being compressed by system 800, combustion turbine 808 can use some of the process gas as the fuel for combustion. This makes system 800 particularly suitable for remote locations where power and other fuels are not readily accessible. An important feature of system 800 is the inclusion of an absorption chiller system 812 that uses heat from the exhaust 816 of combustion turbine 808 to chill a coolant 820, such as water, for use in one or more heat exchangers 822 (only one shown for convenience) for cooling the hydrogen process gas at any one or more stages of the compression process, such as prior to compression, between sequential stages, after compression and in recirculation, and any combination thereof. Absorption chiller system 812 includes one or more absorption chillers 824 (only one shown for conve-

TABLE

Example Performance Details

|  | Stage 1 | Stage 2 | Stage 3 | Stage 4 | Stage 5 | Stage 6 | Overall |
|---|---|---|---|---|---|---|---|
| Speed (rpm) | 60000 | 60000 | 60000 | 60000 | 60000 | 60000 | |
| Power (HP) | 1388 | 1388 | 1449 | 1469 | 1427 | 1445 | 8566 |
| Eff TT Var P | 80.6% | 80.8% | 82.3% | 81.6% | 81.2% | 80.4% | |
| Pressure Ratio TT | 1.25 | 1.25 | 1.27 | 1.27 | 1.26 | 1.26 | |
| Specific Speed | 0.64 | 0.58 | 0.49 | 0.44 | 0.40 | 0.36 | |
| Specific Speed (US) | 82.5 | 74.4 | 63.7 | 56.8 | 52.1 | 46.5 | |
| U2 (ft/s) | 2094 | 2094 | 2094 | 2094 | 2094 | 2094 | |
| Impeller Diam (in) | 8 | 8 | 8 | 8 | 8 | 8 | |
| Backsweep (B2B) (deg) | 0 | 0 | 0 | 0 | −20 | −20 | |
| T02M (F) | 146.2 | 146.0 | 147.9 | 148.3 | 146.7 | 146.9 | |
| Pexit (psig) | 438.1 | 535.8 | 667.9 | 834.2 | 1035.7 | 1287.4 | |
| Flow Coeffs Phi | 0.178 | 0.146 | 0.119 | 0.095 | 0.077 | 0.062 | |
| Misc Work Coefficient | 0.916 | 0.917 | 0.957 | 0.970 | 0.942 | 0.954 | |

Referring now to FIGS. 5-7, and also to FIGS. 2 and 3A, gearbox 204 is designed for a final drive ratio of 33.3:1 so that when input shaft 220 is driven at a speed of 1,800 rpm, each of compressors 208A-F is driven to 60,000 rpm by the gearbox. Gearbox 204 achieves this final drive ratio using a large bull gear 500 that is directly driven by input shaft 220. Large bull gear 500 meshes with three smaller pinion gears 504A-C that each drive a pair of small bull gears 508A-F, one on each nience) that may be any suitable type of chiller, including one that uses ammonia as the refrigerant and water as the absorbent and one that uses ammonia, hydrogen gas and water. Various types of absorption chillers suitable for use in absorption chiller system 812 are well known in the art such that it is not necessary to describe them in any detail herein for those skilled in the art to understand how to make and use hydrogen gas compression system 800.

In this example, multistage compressor 804 is a four-stage compressor having four centrifugal compressors 828A-D driven by a common gearbox 832, which in turn is driven by combustion turbine 808. Each compressor 828A-D may be the same as or similar to each compressor 112A-F of FIG. 1, and consequently can include either of impeller/shaft assemblies 300, 372 of FIGS. 3A-B. In other embodiments, compressors 828A-D can have configurations different from the configurations described above relative to FIGS. 1-4 and/or can be provided in a different number than shown in FIG. 8. As mentioned above, multistage compressor 804 can be replaced with multistage compressor 200 of FIG. 2, if desired. In that case, however, gearbox 204 will have to be modified to change the final drive ratio if the output speed of combustion turbine 808 is not 1,800 rpm and it is desired to drive compressors 828A-D to the same 60,000 rpm speed discussed above.

Combustion turbine 808 can be any combustion turbine having the necessary output-shaft power for driving at least multistage compressor 804. Preferably, however, combustion turbine 808 is configured for using hydrogen from the process gas as the fuel. Optionally, one or more auxiliary electrical power generators 836 also driven by combustion turbine 808 can be provided for generating electrical power. The electrical power generated by generator(s) 836 can be used, for example, to power the electronics that form part of hydrogen gas compression system 800, such as the control electronics. Of course, the generated electrical power can be used for other purposes as well.

Combustion turbine 808 includes a compressor 840, for compressing air, and one or more combustors 844, where the fuel is added to the compressed air in order to heat the air. The heated exhaust from combustor(s) 844 is then passed through an expansion turbine 848, where the exhaust from the combustor(s) is expanded to provide the power necessary to drive combustion-turbine compressor 840, multistage hydrogen gas compressor 804, and any auxiliary generator(s) 836 or other machinery (not shown). The exhaust from expansion turbine 848 is provided to absorption chiller system 812 to provide the heat needed to power the absorption cycle for chilling coolant 820. In this embodiment, combustion turbine 808 also includes a recouperator 852 that uses heat in the exhaust from expansion turbine to pre-heat the air provided to combustor(s) 844 from combustion-turbine compressor 840.

Figure 9:
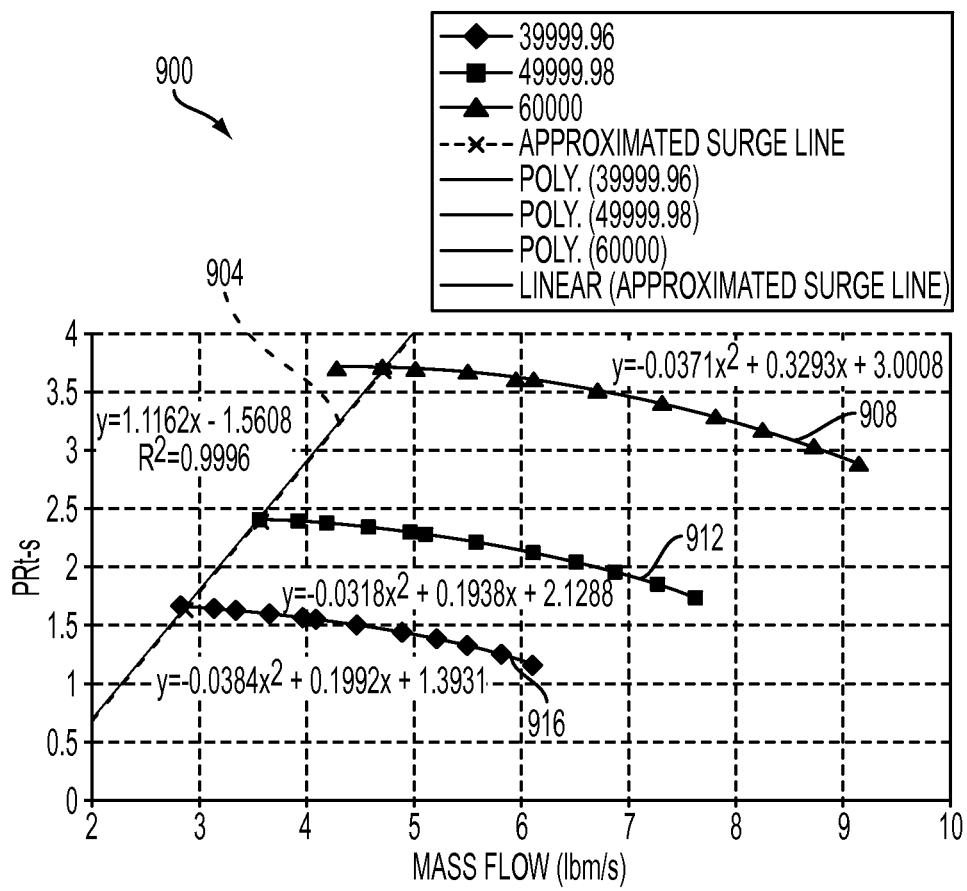
FIG. 9 is an exemplary performance map for a particular example of the multistage compressor shown in FIG. 2.

To achieve the high performance of a hydrogen gas compression system of the present disclosure, the multistage compressor is operated relatively very close to instability. If the system is not designed correctly, an excursion, such as an emergency shutdown (ESD), can cause the compressor to surge. As those skilled in the art know, during surge a compressor loses its ability to maintain peak head and the entire system becomes unstable and experiences flow reversal. Surge causes high fluctuating loads on the compressor's thrust bearings and can result in catastrophic damage to the compressor if left unabated. FIG. 9 illustrates a performance map 900 for the six-stage compressor system 100 described above. In this example, performance map 900 approximates the surge line 904 as being linear and shows three performance lines, line 908 showing the performance at 60,000 rpm, line 912 showing the performance at about 50,000 rpm and line 916 showing the performance at about 40,000 rpm. In normal operation, multistage compressor 200 (FIG. 2) operates to the right of surge line 904 with a margin of 5% to 10% and surge-to-rise ratios of 6% minimum considered acceptable. In one example, the operating point of multistage compressor 204 is 6.1 lbm/s. As seen from line 908 on performance map 900, at this mass flow rate the overall compression ratio is about 3.7.

Referring to FIG. 1, during normal operation, bypass/surge-control system 132 is used to control adequate flow rate through compressors 112A-F by recirculating compressed gas from last stage 104F back to the inlet of first stage 104A. An intercooler, such as heat exchanger 132C, is often needed to reduce the suction temperature if continuous recirculation is required to prevent surge. Operating system 100 very close to its optimum head vs. flow rate operating point requires very precise and rapidly responsive instrumentations and valves.

ESD conditions also require very precise and rapidly responsive instrumentations and valves. During an ESD, the rotational mass inertia of prime mover 116, for example, an electric motor, will continue to drive compressors 112A-F. During the ESD sequence, the flow rate through compressors 112A-F may be reduced to less than the surge limit if the recirculated flow rate cannot relieve the pressure between the outlet of last compressor stage 104F and outlet check valve 128 fast enough. In order to ensure that system 100 is provided with a suitably sized and suitably fast-acting surge valve, the present inventors developed a surge valve design method that can be used to select a surge valve based on ESD conditions. As described below in detail, this method utilizes a thermo-fluid analytical model based on the model 1000 shown in FIG. 10.

Figure 10:
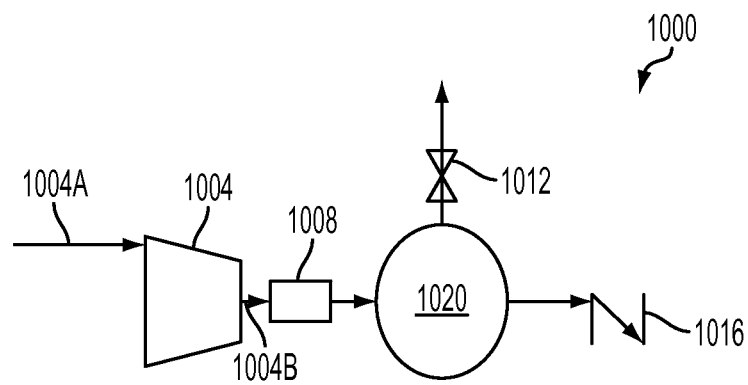
FIG. 10 is a schematic diagram illustrating a model used to formulate a thermo-fluid analytic model for use in selecting a proper surge valve that inhibits surge during an emergency shutdown of a centrifugal compressor.

Referring to FIG. 10, model 1000 includes a compressor 1004 having an input 1004A and an output 1004B, discharge piping 1008, a surge-control valve 1012, an outlet check valve 1016 and the volume 1020 of gas trapped in the discharge piping between the compressor and each of the surge-control and outlet check valves. The stored energy from the mass moment of inertia of the compressor (e.g., multistage compressor 200 of FIG. 2) and prime mover 116 (FIG. 1) will continue to compress hydrogen until the stored energy of the compressor/prime mover system is dissipated with time. The rate of change of energy (compression power) for the system is given by the following Equation 1a as a function of the instantaneous speed, N, and the rate of change of speed, $$\left(\frac{\partial N}{\partial t}\right).$$

$$\text{Compressor Power} = \left(\frac{I_{motor+compressor}}{g_c}\right) \times N \times \frac{\partial N}{\partial t} \quad \{\text{Eq. 1a}\}$$

Wherein:
$I_{motor+compressor}$ is the mass moment of inertia of the motor (prime mover) and compressor; and
$g_c$ is the gravitational constant=32.2 Lbm-ft/Lbf/s$^2$.

The complete equation with the expression for the compression power as a function of volume flow rate and pressure ratio is given by Equation 1b, below.

$$\dot{Q} \times \rho \times Cp \times Tr \times \left[\left(\frac{Po}{Pi}\right)^{\frac{k-1}{k}} - 1\right] = I \times \frac{4\pi^2}{g_c} \times N \times \frac{\partial N}{\partial t} \quad \{\text{Eq. 1b}\}$$

Wherein:
$\dot{Q}$ is the volume flow rate of the hydrogen gas;
$\rho$ is the density of the hydrogen gas;
Cp is the specific heat of the gas in BTU/Lbm/F;

Tr is the compressor inlet's absolute temperature (Rankine);
Po is the outlet pressure of the compressor;
Pi is the inlet pressure of the compressor;
k is the specific heat ratio (Cp/Cv);
I is the mass moment of inertia of the motor (prime mover) and compressor; and
$g_c$ is the gravitational constant=32.2 Lbm-ft/Lbf/s².

As the stored rotational energy of the compressor/primermover system continues to compress the hydrogen gas, the trapped volume 1020 of gas will be relieved if a surge valve having a sufficiently large flow coefficient Cv is used, and compressor surge can be prevented if the gas is recirculated to the suction of the compressor. The flow coefficient Cv can be determined from the following Equation 2.

$$\dot{Q}=C_v \times (P_n-P_{suction})^{1/2} \quad \{Eq. 2\}$$

Wherein:
$\dot{Q}$ is the volume flow rate of the hydrogen gas;
$P_n$ is the nth pressure increment out of the compressor; and
$P_{suction}$ is the suction pressure of the compressor.

The equation that determines the amount of hydrogen gas that can pass through the surge valve (e.g., valve 132A in FIG. 1) is provided in Equation 3, below.

$$(\dot{M}_{in} - \dot{M}_{out}) \times R_u \times \frac{T}{V \times MoleWt} = \frac{\partial P}{\partial t} \quad \{Eq. 3\}$$

Wherein:
$\dot{M}_{in}$ is the mass flow rate of the hydrogen gas into the valve;
$\dot{M}_{out}$ is the mass flow rate of the hydrogen gas out of the valve;
$R_u$ is the universal gas constant=1,545 ft-Lbf/Lbmole/R;
T is the absolute temperature at the discharge of the compressor (Rankine);
V is the volume capacity of the discharge piping (ft³);
MoleWt is mole weight of the hydrogen gas; and
$\partial P/\partial T$ is the rate of change of pressure with respect to time.

The rate of change of the pressure for the hydrogen gas trapped in volume 1020 is based on the formulation shown in Equation 3 and is a function of the amount of gas that is being delivered to the trapped volume by compressor 1004 and the amount of gas that is being relieved via surge-control valve 1012.

Figure 11:
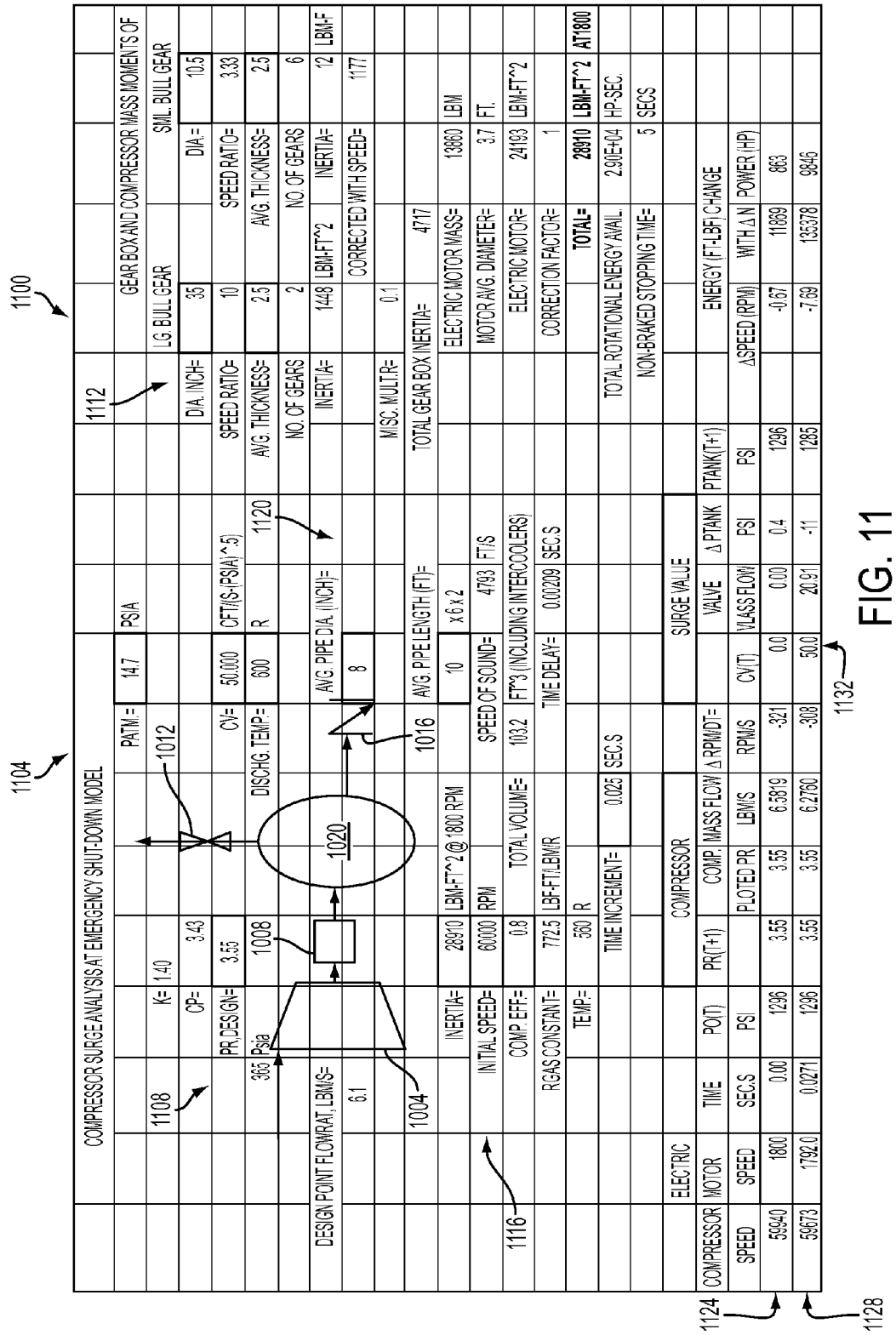
FIG. 11 is screenshot of the user interface of software used for selecting a proper surge valve that inhibits surge during an emergency shutdown (ESD) of a centrifugal compressor.

FIG. 11 illustrates a screenshot 1100 of a graphical user interface (GUI) 1104 of software (not shown) that mathematically models model 1000 of FIG. 10 (graphically represented for the benefit of the user in the screenshot at 1108). GUI 1104 allows a user to readily input into the software values for all of the fixed parameters that will be used for analyzing the impact of differing valve coefficients on the operation of the subject compressor, for example, multistage compressor 200 of FIG. 2, during an ESD event. As mentioned above, a goal of this analysis is to inform a designer in selecting a surge-control valve, such as valve 132A in FIG. 1, that is large enough, but also fast enough, to prevent the compressor from surging during the ESD event. It is noted that the surge-control valve cannot be excessively large because this usually implies a very large and costly valve. As seen in FIG. 11, in this example, input parameters include parameters 1112 for calculating the mass moment of inertia of the gearbox and compressors of multistage compressor 1004, parameters 1116 for modeling the multistage compressor, and parameters 1120 for modeling piping 1008 and its volume 1020 between the compressor and outlet check valve 1016, among other parameters needed for the analysis.

The calculations using the thermo-fluid analytical model of the software begins with the design point operation of the pressure ratio and flow rate at time t=0 seconds and proceeds with determining the next compressor flow rate based on the incremental change in the compressor speed using Equation 1b, above. The change in the pressure of the hydrogen gas trapped in volume 1020 determines the discharge pressure of the compressor during the next time step, here Δt=0.271 seconds, using Equation 3, above. This new pressure is used in conjunction with the performance curves (not shown) for compressor 1004 to determine the new flow rate that the compressor will deliver as a function of the new discharge pressure at this next time step as determined by Equation 3. This new flow rate and discharge pressure then begins another calculation at a new time step, $t_{n+1}$. The two initial calculations are reflected in lines 1124, 1128, respectively, of GUI 1104.

Figure 12A:
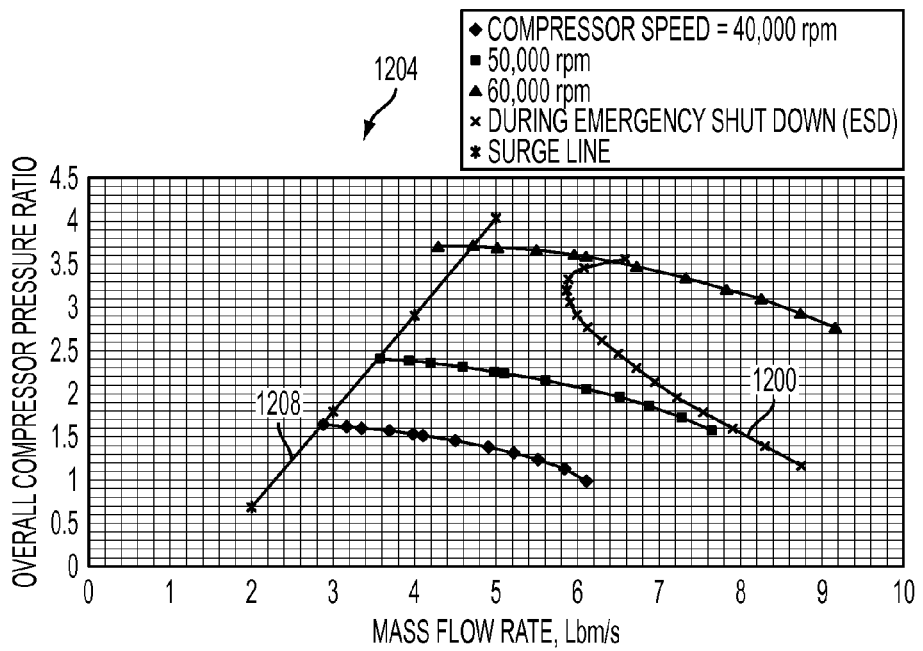
FIG. 12A is an exemplary performance map for a particular example of the multistage compressor shown in FIG. 2, showing the ESD shutdown path of the compressor when the surge-control valve flow coefficient Cv value is 50 $ft^3/sec/(psig)^{0.5}$.

As can be readily understood by those skilled in the art, once the physical sizes of piping 1008 and trapped-gas volume 1020 and the particular data for compressor 1004 and the prime mover are input into GUI 1104, the only parameter that is changed in the analysis is the magnitude of the surge-control valve flow coefficient Cv 1132. By changing the value of flow coefficient Cv, the thermo-fluids model calculates the path 1200 of the pressure ratio versus flow rate for compressor 1004 and can be plotted on a performance map 1204 as illustrated in FIG. 12A. A properly selected surge-control valve flow coefficient (and, correspondingly, surge-control valve itself), such as the one that yields path 1200 in FIG. 12A, will fall to the right of surge line 1208. As can be readily seen, path 1200 stays completely to the right of surge line 1208 and, therefore, compressor 1004 does not become unstable during an ESD event. In this particular example, the surge-control valve flow coefficient Cv has a value of 50 ft³/sec/(psig)$^{0.5}$.

A very large surge-control valve may require a measurable amount of time before it can respond to the ESD event that has been caused to the system by a number of different reasons. This time delay causes the pressure in trapped volume 1020 (FIG. 10) of the gas to increase with a subsequent decrease in the flow rate that can only be overcome with an even larger surge valve. The thermo-fluids analytic method of the present disclosure determines the speed of sound in the trapped gas (e.g., hydrogen gas) and hence the time delay in the control's response to a system ESD. However, the response time of the pressure and temperature instruments and the processing time for the control system that is used with the surge control system must be known and used as an input to the ESD surge model.

Figure 12B:
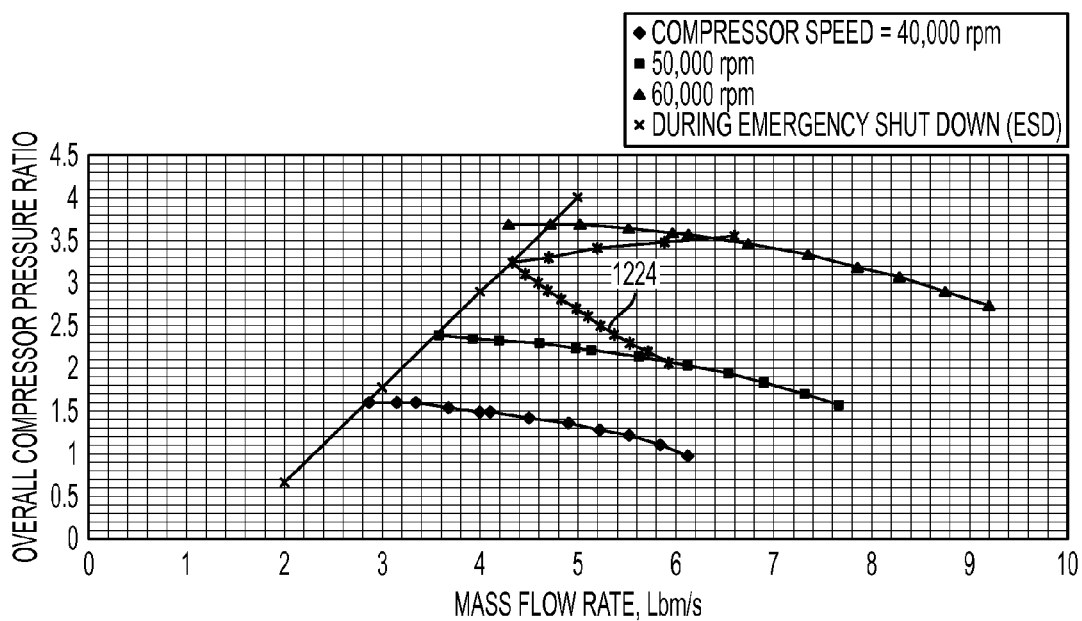
FIG. 12B is an exemplary performance map for the multistage compressor corresponding to FIG. 12A, showing the ESD shutdown path of the compressor when the surge-control valve flow coefficient Cv value is 31 $ft^3/sec/(psig)^{0.5}$.
Figure 12C:
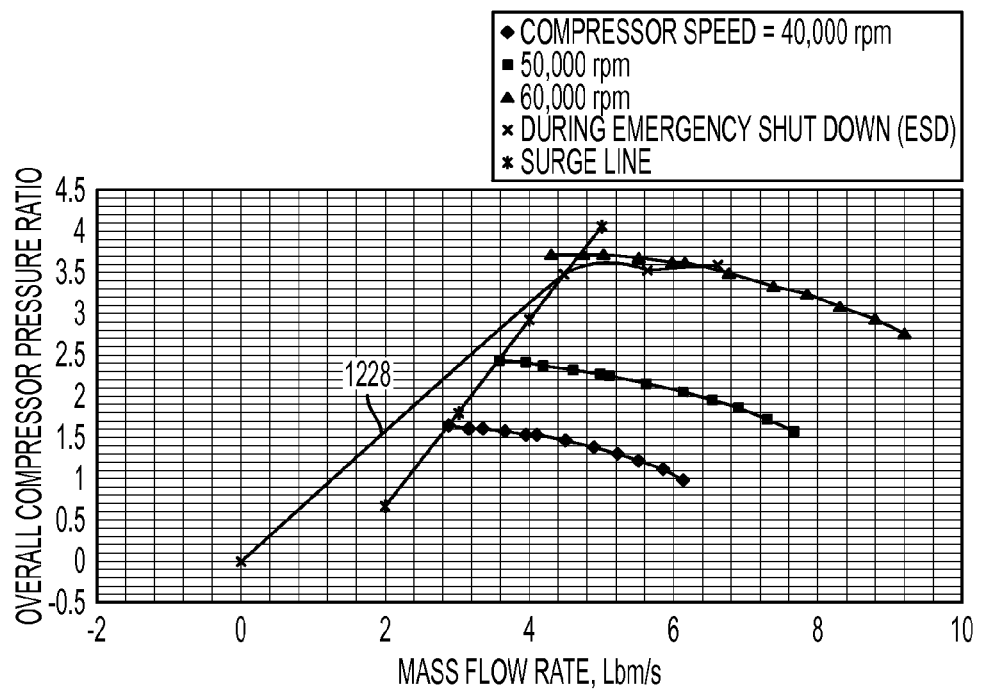
FIG. 12C is an exemplary performance map for the multistage compressor corresponding to FIGS. 12A-B, showing the ESD shutdown path of the compressor when the surge-control valve flow coefficient Cv value is 30 $ft^3/sec/(psig)^{0.5}$.
Figure 12D:
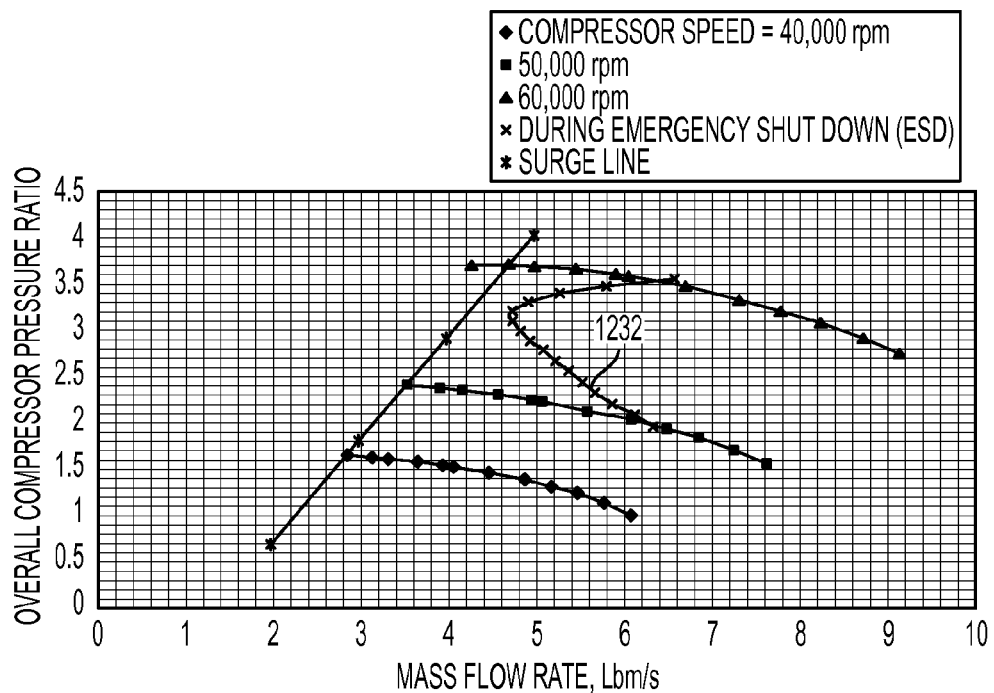
FIG. 12D is an exemplary performance map for the multistage compressor corresponding to FIGS. 12A-C, showing the ESD shutdown path of the compressor when the surge-control valve flow coefficient Cv value is 38 $ft^3/sec/(psig)^{0.5}$.

A small change in the surge-control valve coefficient Cv can have a large effect on the safe performance of a compressor system. For example, FIGS. 12B-C, reveal performance paths 1224, 1228, respectively, when compressor 1004 that is in danger of imminent surge failure and ultimate surge failure. In the case of FIG. 12B, the value of surge-control valve flow coefficient Cv used in the model is 31 ft³/sec/(psig)$^{0.5}$, and, in FIG. 12C, the value of surge-control valve flow coefficient Cv used in the model is 30 ft³/sec/(psig)$^{0.5}$. These are to be compared with ESD path 1232 shown in FIG. 12D where the surge-control valve flow coefficient Cv is 38 ft³/sec/(psig)$^{0.5}$.

Figure 13:
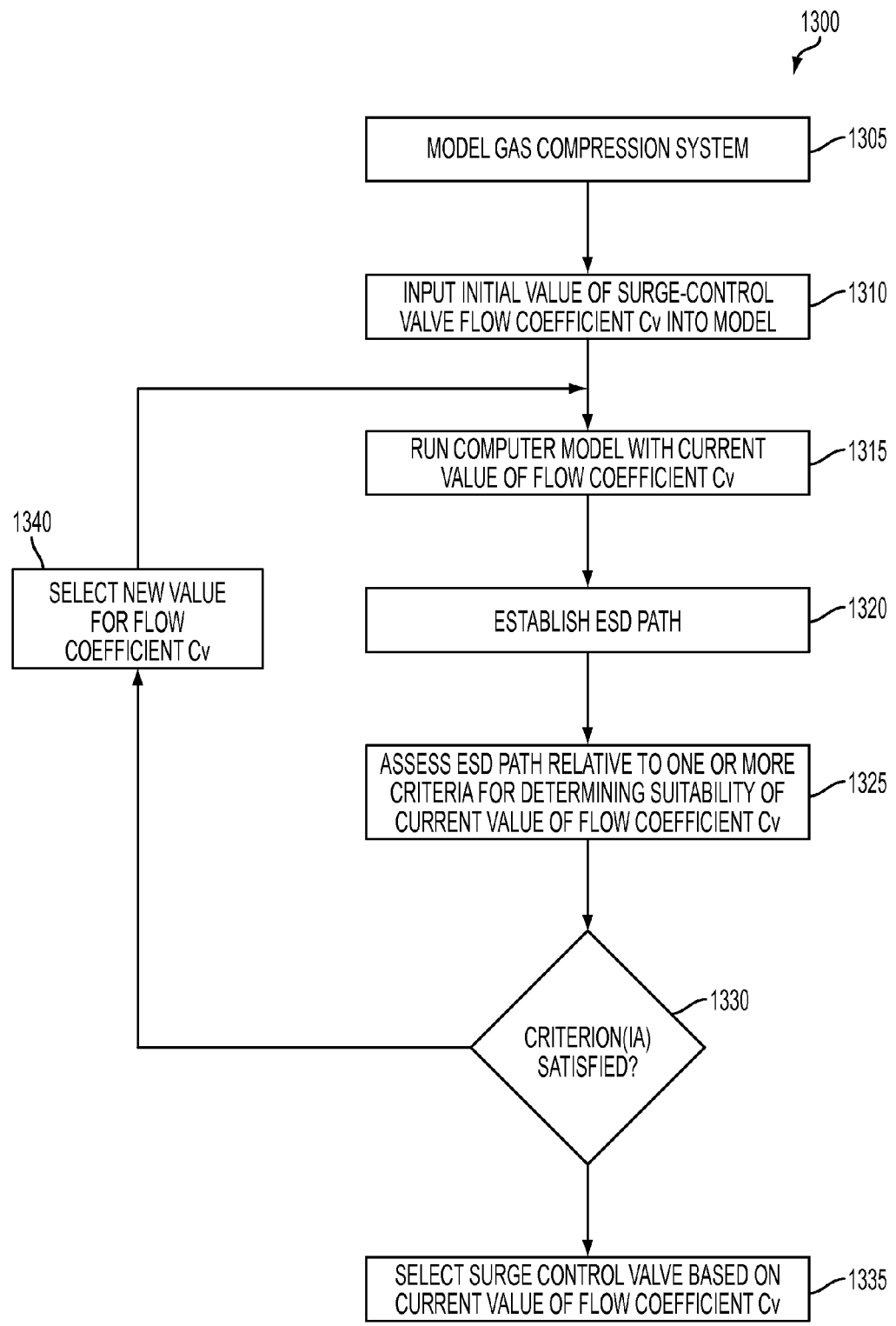
FIG. 13 is a flow diagram illustrating a method of selecting a surge-control valve for a gas compression system.

With the foregoing in mind, FIG. 13 illustrates an exemplary method 1300 of selecting a properly sized surge-control valve for an ESD event in a centrifugal gas compression system in which residual rotational energy from the mass inertia of rotating parts within the compressor and prime mover driving the compressor keeps driving the compressor after power or fuel to the prime mover is shutdown. At step 1305, a computer model of the gas compression system, such as model 1000 of FIG. 10, is created. This step involves inputting into the model, for example, using a GUI the same as or similar to GUI 1104 of FIG. 11, values for various parameters needed to run the model, such as parameters 1108, 1112, 1116, 1120 of FIG. 11. At step 1310, an initial value of the flow coefficient Cv for the surge-control valve is input into the model, and, at step 1315, the computer model is run for various increments of time following the time when the providing of power/fuel for the prime mover is cut and the moving parts of the prime mover and compressor begin to wind down. At this step, the computer model performs the iterative calculations described above.

At step 1320, an ESD path is established, typically, by the computer used to run the computer model. Examples of the ESD path generated at step 1320 include paths 1200, 1224, 1228, 1232 graphically shown, respectively, in FIGS. 12A-D. The ESD path established at step 1320 can be in any suitable form for further processing, such as a collection of overall-compression-pressure-ratio-versus-mass-flow-rate data points. In other embodiments, the data points calculated at step 1315 can be subjected to a curve-fitting algorithm and/or plotted on a performance map for graphical analysis.

At step 1325, the ESD path is compared to a surge line for the compressor at issue to determine its relation to the surge line. This can be accomplished using automated algorithms for determining where the calculated data points of the ESD path or any point on a curve fitted thereto are located relative to the surge line. At step 1325, the location of the ESD path is assessed to determine whether or not it satisfies one or more criteria established for a properly sized surge-control valve. For example, the criteria may be that the ESD path be to the right of the surge line and that the closest point on the ESD path be spaced at least a certain minimum distance (in proper performance map unit terms) from the surge line. This minimum distance may include a safety margin for modeling errors and other factors of safety. On the other hand, it might be determined that the ESD path is too far to the right of the surge line and, therefore, that the flow coefficient Cv is too large such that the resulting physical surge-control valve would be too large and/or too slow-acting. Step 1325 can be performed automatically by the computer or may be performed by a designer, for example, viewing a plot of the ESD path on a performance map.

At step 1330 it is determined whether or not the criterion (ia) at step 1325 is/are satisfied. If the criterion(ia) is/are determined to be satisfied at step 1330, method 1300 proceeds to step 1335 wherein the current value of the flow coefficient Cv is used to select a surge-control valve. If, however, at step 1330 it is determined that the criterion(ia) at step 1325 is/are not met, method 1300 proceeds to step 1340 wherein a new value for the flow coefficient Cv is selected. Depending on how the ESD path failed the criterion(ia), the new value selected can be either larger or smaller than the value just used. For example, if the determination at step 1330 was that the ESD path was too close to the surge line, then at step 1340 a larger flow-coefficient value is selected. On the other hand, if the determination at step 1330 was that the ESD path was too far to the right of the surge line, then at step 1340 a smaller flow-coefficient value is selected. Once a new value for flow coefficient Cv has been selected at step 1340, method 1300 proceeds to step 1315 at which point the model is re-run with the new value. Steps 1315 through 1340 are repeated until the ESD path satisfies the desired criterion(ia), allowing a proper surge-control valve to be selected at step 1335.

Figure 14:
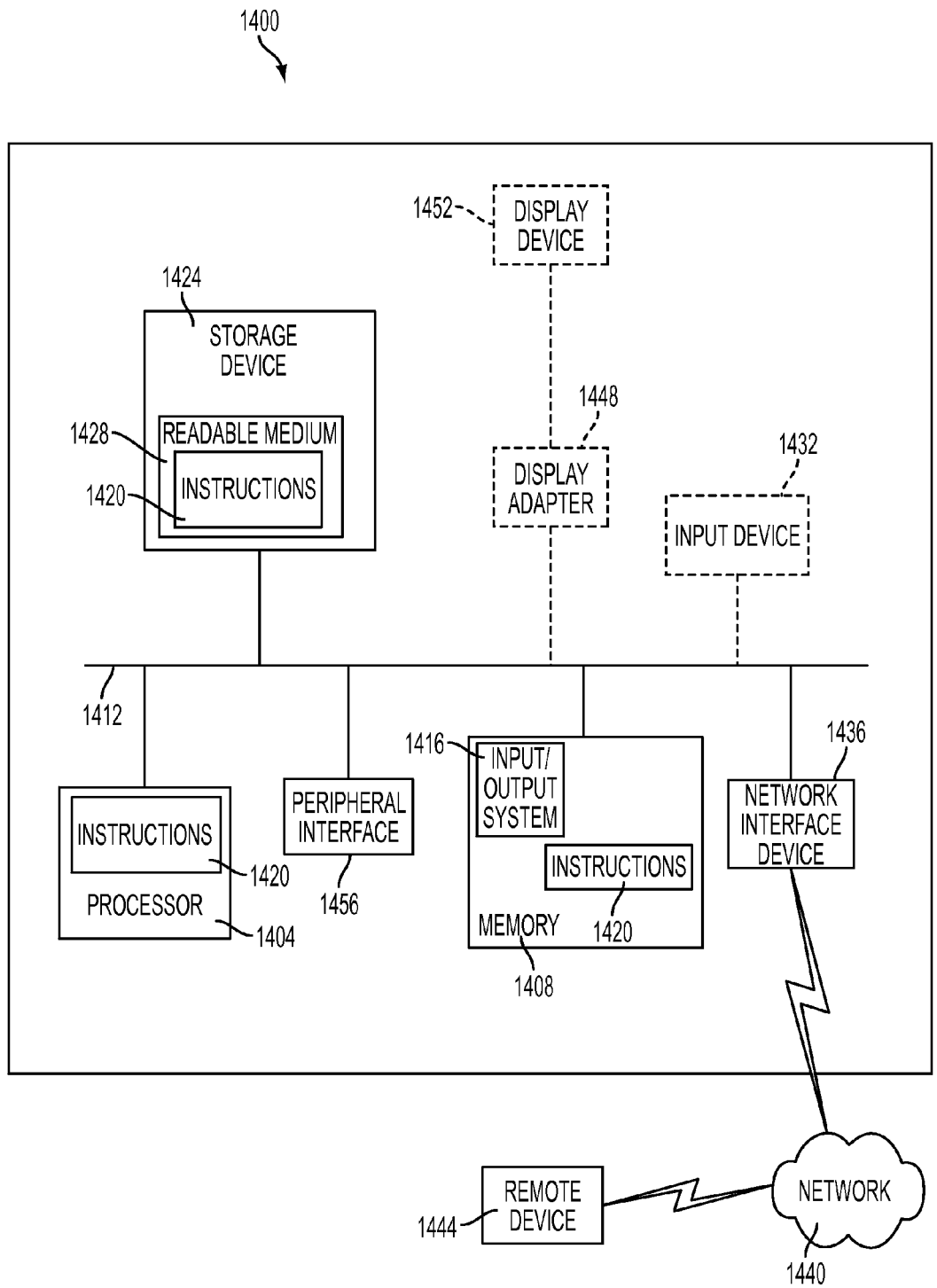
FIG. 14 is a high-level schematic diagram illustrating a computing device representative of computing devices that can be used in implementing the method of FIG. 13.

FIG. 14 shows a diagrammatic representation of one embodiment of a computing device in the exemplary form of a computer system 1400 within which a set of instructions for causing the device to perform any one or more of the aspects and/or methodologies of the present disclosure may be executed. Computer system 1400 includes a processor 1404 (e.g., a microprocessor) (more than one may be provided) and a memory 1408 that communicate with each other, and with other components, via a bus 1412. Bus 1412 may include any of several types of bus structures including, but not limited to, a memory bus, a memory controller, a peripheral bus, a local bus, and any combination thereof, using any of a variety of bus architectures well known in the art.

Memory 1408 may include various components including, but not limited to, a random access read/write memory component (e.g., a static RAM (SRAM), a dynamic RAM (DRAM), etc.), a read-only component, and any combination thereof. In one example, a basic input/output system 1416 (BIOS), including basic routines that help to transfer information between elements within computer system 1400, such as during start-up, may be stored in memory 1408. Memory 1408 may also include (e.g., stored on one or more machine-readable media) instructions (e.g., software) 1420 embodying any one or more of the aspects and/or methodologies of the present disclosure. In another example, memory 1408 may further include any number of instruction sets including, but not limited to, an operating system, one or more application programs, other program modules, program data, and any combination thereof.

Computer system 1400 may also include one or more storage devices 1424. Examples of storage devices suitable for use as any one of the storage devices 1424 include, but are not limited to, a hard disk drive device that reads from and/or writes to a hard disk, a magnetic disk drive device that reads from and/or writes to a removable magnetic disk, an optical disk drive device that reads from and/or writes to an optical medium (e.g., a CD, a DVD, etc.), a solid-state memory device, and any combination thereof. Each storage device 1424 may be connected to bus 1412 by an appropriate interface (not shown). Example interfaces include, but are not limited to, Small Computer Systems Interface (SCSI), advanced technology attachment (ATA), serial ATA, universal serial bus (USB), IEEE 13144 (FIREWIRE), and any combination thereof. In one example, storage device 1424 may be removably interfaced with computer system 1400 (e.g., via an external port connector (not shown)). Particularly, storage device 1424 and an associated machine-readable storage medium 1428 may provide nonvolatile and/or volatile storage of machine-readable instructions, data structures, program modules, and/or other data and/or data storage for computer system 1400. In one example, instructions 1420 may reside, completely or partially, within machine-readable storage medium 1428. In another example, instructions 1420 may reside, completely or partially, within processor 1404.

In some embodiments, such as a general purpose computer, computer system 1400 may also include one or more input devices 1432. In one example, a user of computer system 1400 may enter commands and/or other information into the computer system via one or more of the input devices 1432. Examples of input devices that can be used as any one of input devices 1432 include, but are not limited to, an alpha-numeric input device (e.g., a keyboard), a pointing device, a joystick, an audio input device (e.g., a microphone, a voice response system, etc.), a cursor control device (e.g., a mouse), a touch-pad, an optical scanner, a video capture device (e.g., a still camera, a video camera), touchscreen, a digitizer pad, and any combination thereof. Each input device 1432 may be interfaced to bus 1412 via any of a variety of interfaces (not shown) including, but not limited to, a serial interface, a parallel interface, a game port, a Universal Serial Bus (USB) interface, a FIREWIRE interface, a direct interface to the bus, a wireless interface (e.g., a Bluetooth® connection) and any combination thereof.

Commands and/or other information may be input to computer system 1400 via storage device 1424 (e.g., a removable disk drive, a flash drive, etc.) and/or one or more network interface devices 1436. A network interface device, such as network interface device 1436, may be utilized for connecting computer system 1400 to one or more of a variety of networks, such as network 1440, and one or more remote devices 1444 connected thereto. Examples of a network interface device include, but are not limited to, a network interface card, a modem, a wireless transceiver (e.g., a Bluetooth® transceiver) and any combination thereof. Examples of a network include, but are not limited to, a wide area network (e.g., the Internet, an enterprise network), a local area network (e.g., a network associated with an office, a building, a campus, a group of wireless sensors or other group of data streaming devices, or other relatively small geographic space), a telephone network, a direct connection between two computing devices, and any combination thereof. A network, such as network 1440, may employ a wired and/or a wireless mode of communication. In general, any network topology may be used. Information (e.g., data, instructions 1420, etc.) may be communicated to and/or from computer system 1400 via the one or more network interface devices 1436.

In some embodiments, such as a general purpose computer, computer system 1400 may further include a video display adapter 1448 for communicating a displayable image to a display device, such as display device 1452. Examples of a display device include, but are not limited to, a liquid crystal display (LCD), a cathode ray tube (CRT), a plasma display, and any combination thereof. In addition to a display device, a computer system 1400 may include one or more other peripheral output devices including, but not limited to, an audio speaker, a printer, and any combination thereof. Such peripheral output devices may be connected to bus 1412 via a peripheral interface 1456. Examples of a peripheral interface include, but are not limited to, a serial port, a USB connection, a FIREWIRE connection, a parallel connection, and any combination thereof.

A digitizer (not shown) and an accompanying pen/stylus, if needed, may be included in order to digitally capture freehand input. A pen digitizer may be separately configured or coextensive with a display area of display device 1452. Accordingly, a digitizer may be integrated with display device 1452, or may exist as a separate device overlaying or otherwise appended to the display device.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus, comprising:
   an impeller support shaft having a first end, a second end spaced from the first end, a first rotational axis, and a first central bore extending from said first end to said second end along said first rotational axis, wherein said impeller support shaft includes at least one bearing region for engaging at least one of a rotational bearing and a thrust bearing during use of the apparatus;
   a centrifugal impeller that includes a rotor body and a plurality of blades arranged generally radially on said rotor body, wherein said centrifugal impeller has a second rotational axis and said rotor body has a length along said second rotational axis and a second central bore extending along said second rotational axis to a depth that is less than said length; and
   an impeller attachment system engaging said second central bore and said second end of said impeller support shaft so as to secure said centrifugal impeller to said impeller support shaft at said first end of said impeller support shaft such that said first and second rotational axes are coincident with one another, said impeller attachment system including a tension rod extending through said first longitudinal central bore compressing said impeller support shaft between said first and second ends thereof;
   wherein said centrifugal impeller has an inlet region and an outlet region, wherein ones of said plurality of blades are forward-swept at said outlet region and at least some of said plurality of blades are forward-swept at said inlet region, further wherein said plurality of blades include longer blades, shorter blades and intermediate length blades, said longer, shorter and intermediate length blades being arranged in a dual-split impeller arrangement.

2. An apparatus according to claim 1, wherein said first end of said impeller support shaft and said centrifugal impeller each include face splines that inter-engage one another.

3. An apparatus according to claim 1, wherein said impeller attachment system further includes an insert engaged in said second central bore of said centrifugal impeller, said tension rod threadedly engaging said insert.

4. An apparatus according to claim 1, wherein said impeller attachment system includes a nut threadedly secured to said tension rod at said second end of said impeller support shaft.

5. An apparatus according to claim 1, wherein said plurality of blades consist essentially of said longer blades, said shorter blades and said intermediate length blades.

6. A system, comprising:
   a hydrogen gas compressor that includes:
   a plurality of centrifugal compressors fluidly interconnected with one another so as to provide a plurality of sequential compression stages, wherein each of said plurality of centrifugal compressors is configured to be capable of providing a pressure increase ratio of approximately 1.20 to approximately 1.27 to hydrogen gas being compressed thereby during operation;
   each of said plurality of centrifugal compressors having an impeller, at least one of said impellers having an inlet region, an outlet region and a plurality of blades, wherein ones of said plurality of blades are forward-swept at said outlet region and at least some of said plurality of blades are forward-swept at said inlet region, further wherein said plurality of blades include longer blades, shorter blades and intermediate length blades, wherein said longer, shorter and intermediate length blades are arranged in a dual-split impeller arrangement.

7. A system according to claim 6, wherein said plurality of centrifugal compressors comprise six centrifugal compressors wherein said impeller of each of said six centrifugal compressors has an outside diameter between approximately 7 inches and approximately 8 inches, and each said impeller being designed to operate between approximately 50,000 rpm and approximately 60,000 rpm during normal operation.

8. A system according to claim 7, wherein each said impeller is made of an aluminum alloy.

9. A system according to claim 8, wherein:
each said impeller has a rotational axis and an impeller body having a blind tapped hole extending along said rotational axis only partway into said impeller body; and
each of said plurality of compressors has a respective impeller support shaft supporting a corresponding said impeller, the system comprising a plurality of tension rods, wherein one of said tension rods secures each said impeller to a corresponding said impeller support shaft.

10. A system according to claim 7, wherein said hydrogen gas compressor is capable of providing a flow rate between approximately 200,000 kg/day and approximately 240,000 kg/day at a discharge pressure between about 1,000 psig and about 1,285 psig.

11. A system according to claim 6, further comprising a gearbox, wherein:
said gearbox includes a housing having a first side and a second side spaced from said first side;
a first set of said plurality of centrifugal compressors is located on said first side of said housing and a second set of said plurality of centrifugal compressors is located on said second side of said housing;
said gearbox further includes a first bull gear and a plurality of dual-bull-gear assemblies engaging said first bull gear so as to be driven thereby, wherein each of said plurality of dual-bull-gear assemblies includes a second bull gear for driving a corresponding compressor of said first set on said first side, and a third bull gear for driving a corresponding compressor of said second set on said second side.

12. A system according to claim 11, wherein each of said second and third bull gears has teeth configured for receiving thrust loads from corresponding ones of said plurality of centrifugal compressors on opposing sides of said housing so that the thrust loads tend to cancel one another by acting on a common one of said plurality of dual-bull-gear assemblies.

13. An apparatus according to claim 6, wherein said plurality of blades consist essentially of said longer blades, said shorter blades and said intermediate length blades.

14. A system, comprising:
an inlet for receiving a stream of hydrogen gas;
a hydrogen gas compressor for compressing a stream of hydrogen gas, said hydrogen gas compressor including a plurality of centrifugal compressors fluidly coupled with one another so as to provide a plurality of compression stages;
at least one intercooler for cooling the stream of hydrogen gas between ones of said plurality of compression stages;
a combustion turbine operatively coupled to said hydrogen gas compressor so as to drive said hydrogen gas compressor, wherein said combustion turbine produces exhaust during operation; and
an absorption chiller system operatively connected to said at least one intercooler so as to provide a coolant thereto, said absorption chiller system including at least one absorption chiller that utilizes the exhaust of said combustion turbine during operation of the system to cool said coolant;
wherein at least one of said plurality of centrifugal compressors includes an impeller having a plurality of blades and having an inlet region and an outlet region, wherein ones of said plurality of blades are forward-swept at said outlet region and at least some of said plurality of blades are forward-swept at said inlet region, further wherein said plurality of blades include longer blades, shorter blades and intermediate length blades, said longer, shorter and intermediate length blades being arranged in a dual-split impeller arrangement.

15. A system according to claim 14, wherein said hydrogen gas compressor is capable of providing a flow rate between approximately 200,000 kg/day and approximately 240,000 kg/day at a discharge pressure between about 1,000 psig and about 1,285 psig.

16. A system according to claim 14, wherein at least one of said plurality of centrifugal compressors has an impeller having an outside diameter of between approximately 7 inches (17.78 cm) and approximately 8 inches.

17. A system according to claim 16, wherein each said impeller is designed to operate at between approximately 50,000 rpm and approximately 60,000 rpm during normal operation.

18. A system according to claim 17, wherein each said impeller is made of an aluminum alloy.

19. A system according to claim 14, wherein said gearbox is configured to drive each of said plurality of centrifugal compressors at between approximately 50,000 rpm and approximately 60,000 rpm during normal operation.

20. A system according to claim 19, wherein each of said second and third bull gears has teeth configured for receiving thrust loads from corresponding ones of said plurality of centrifugal compressors on opposing sides of said housing so that the thrust loads tend to cancel one another by acting on a common one of said plurality of dual-bull-gear assemblies.

21. A system according to claim 19, wherein said gearbox is configured to drive each of said plurality of centrifugal compressors at at least 50,000 rpm during normal operation.

22. An apparatus according to claim 14, wherein said plurality of blades consist essentially of said longer blades, said shorter blades and said intermediate length blades.

23. A multi-stage high-speed compressor comprising:
a plurality of centrifugal compressors in fluid communication for providing sequential
compression stages, at least one of the plurality of centrifugal compressors comprising:
a centrifugal impeller having a plurality of blades, said plurality of blades including a plurality of first blades and a pair of equal-length splitter blades disposed between adjacent ones of said plurality of first blades;
said centrifugal impeller further comprising a blind central bore that extends only partially into the impeller;
wherein said centrifugal impeller further includes a plurality of second blades having a shorter length than said plurality of first blades, wherein one of said second blades is located between each of said pair of splitter blades; and
wherein ones of said plurality blades have a leading end that are forward-swept and at least one of said plurality of blades has a trailing end that is forward-swept.

24. A compressor according to claim 23, wherein said impeller is made of at least one of an aluminum alloy and a titanium alloy.

25. A compressor according to claim 23, wherein each of said plurality of centrifugal compressors include said centrifugal impeller, and wherein each of said centrifugal impellers have substantially the same maximum outer diameter.

26. A compressor according to claim 23, wherein said at least one of said plurality of centrifugal compressors further comprises an impeller drive shaft having a central bore and a tension rod disposed in said central bore of said drive shaft, said tension rod coupled to said blind central bore of said impeller and configured to secure said impeller to said drive shaft.

27. An apparatus according to claim 23, wherein said plurality of blades consist essentially of said longer blades, said shorter blades and said intermediate length blades.

\* \* \* \* \*